(12) United States Patent
Borne-Pons et al.

(10) Patent No.: US 10,250,394 B1
(45) Date of Patent: Apr. 2, 2019

(54) CRYPTOLOGIC SELF-EXECUTING BLOCKCHAIN EXPORT COMMITMENT

(71) Applicant: Accenture Global Solutions Limited, Dublin (IE)

(72) Inventors: Hugo Borne-Pons, Juan-les-Pins (FR); Giuseppe Giordano, Juan-les-Pins (FR); Luca Schiatti, Juan-les-Pins (FR); Naima Hamouma, Valbonne (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/136,700

(22) Filed: Sep. 20, 2018

(51) Int. Cl.
| | |
|---|---|
| *H04L 9/32* | (2006.01) |
| *G06F 17/30* | (2006.01) |
| *H04L 9/06* | (2006.01) |
| *H04L 9/08* | (2006.01) |
| *G06Q 20/38* | (2012.01) |

(52) U.S. Cl.
CPC ...... *H04L 9/3247* (2013.01); *G06F 17/30185* (2013.01); *G06F 17/30194* (2013.01); *G06F 17/30283* (2013.01); *G06Q 20/382* (2013.01); *H04L 9/0643* (2013.01);
(Continued)

(58) Field of Classification Search
CPC ..... H04L 9/32; H04L 9/06; H04L 9/08; H04L 9/3247; H04L 9/0819; H04L 9/0861; H04L 2209/38; H04L 9/0643; G06F 17/30; G06F 17/30185; G06F 17/30194; G06F 17/30283; G06Q 20/38; G06Q 20/0643; G06Q 20/382
See application file for complete search history.

(56) References Cited

U.S. PATENT DOCUMENTS

| | | |
|---|---|---|
| 2016/0260169 A1 | 9/2016 | Arnold et al. |
| 2017/0155515 A1* | 6/2017 | Androulaki ............ G06F 21/64 |

(Continued)

OTHER PUBLICATIONS

Mirko Boehm, "The Emerging Blockchain Innovation Landscape," dated Oct. 22, 2018, pp. 1-26, published by Open Invention Network, Durham, NC.

(Continued)

*Primary Examiner* — Jayesh M Jhaveri
(74) *Attorney, Agent, or Firm* — Brinks Gilson & Lione

(57) ABSTRACT

A data furnisher may append, to a furnisher blockchain, an interoperability smart contract comprising a cryptologic committal. The cryptologic committal may include logic configured to cause a data receiver to commit token data to the receiver blockchain based on a pre-commit authorization. The data furnisher may encrypt, based on a committal key, a pre-commit authorization to transfer token data stored on the furnisher blockchain to the receiver blockchain. The data furnisher may transmit the pre-commit authorization to the data receiver. After transmission of the pre-commit authorization, the data furnisher may receive a pre-commit acknowledgement of the pre-commit authorization. The data furnisher may lock the token data on the furnisher blockchain in response to verification that the token data is appended to the data receiver blockchain. The data furnisher may send the predetermined committal key to the data receiver to commit the token data to the data receiver blockchain.

20 Claims, 11 Drawing Sheets

(52) U.S. Cl.
CPC .......... *H04L 9/0819* (2013.01); *H04L 9/0861* (2013.01); *H04L 2209/38* (2013.01)

(56) References Cited

U.S. PATENT DOCUMENTS

| | | | |
|---|---|---|---|
| 2017/0243193 A1* | 8/2017 | Manian | G06Q 20/3829 |
| 2017/0300978 A1 | 10/2017 | Narasimhan et al. | |
| 2017/0372300 A1 | 12/2017 | Dunlevy et al. | |
| 2018/0019879 A1 | 1/2018 | Kravitz et al. | |
| 2018/0088928 A1* | 3/2018 | Smith | H04L 67/34 |
| 2018/0097635 A1 | 4/2018 | Moses | |
| 2018/0204213 A1 | 7/2018 | Zappier et al. | |
| 2018/0264347 A1* | 9/2018 | Tran | G16H 50/20 |
| 2018/0285996 A1* | 10/2018 | Ma | G06Q 50/184 |

OTHER PUBLICATIONS

Jon Wright et al., "Blockchain Innovation," dated Oct. 19, 2018, pp. 1-4, published by Sterne Kessler, Washington, D.C.

Koen Lievens, "Examining Blockchain Inventions," dated Oct. 22, 2018, pp. 1-7, published by the European Patent Office, Munich, Germany.

Richard Bennett, "Scoping Roundtable for Blockchain," dated Oct. 22, 2018, pp. 1-2, published by the European Patent Office, Munich, Germany.

"Blockchain," dated Oct. 2018, pp. 1-12, published by Deutsche Bank AG, Frankfurt, Germany.

"Interledger Architecture," Interledger, Retrieved from Internet on Aug. 27, 2018, pp. 1-8, published online by Interledger Team, URL: https://interledger.org/rfcs/0001-interledger-architecture/.

Jae Kwon et al., "A Network of Distributed Ledgers," Cosmos, dated Jul. 6, 2018, pp. 1-41, published online by Cosmos Network.

Notice of Allowance, and List of References, from U.S. Appl. No. 16/116,360, dated Dec. 17, 2018, pp. 1-15, U.S. Patent and Trademark Office, Alexandria, VA.

Marieke Flament et al., "Blockchain Technology and Fields of Application," pp. 1-41, published by Circle Internet Financial Limited.

Georg Weber, "Searching Blockchain Patents," European Patent Office, dated Dec. 4, 2018, pp. 1-7, published by the European Patent Office, Munich, Germany.

Yann Ménière, "The emerging blockchain patent landscape," European Patent Office, dated 4, 2018, pp. 1-10, published by the European Patent Office, Munich, Germany.

Koen Lievens, "Examining Blockchain Inventions Based on our established CII practice," European Patent Office, dated Dec. 4, 2018, pp. 1-18, published by the European Patent Office, Munich, Germany.

Wang Xinyi, "How does CNIPA deal with Blockchain," dated Dec. 2018, pp. 1-23, published by National Intellectual Property Administration, Hague, Netherlands.

Nobuyuki Taniguchi, "Evolution of Blockchain-related Patents in Japan," dated Dec. 4, 2018, pp. 1-15, published by Nakamura & Partners, Tokyo, Japan.

* cited by examiner

US 10,250,394 B1

CRYPTOLOGIC SELF-EXECUTING BLOCKCHAIN EXPORT COMMITMENT

TECHNICAL FIELD

This disclosure relates to distributed ledger technology and, in particular, to distributed ledger interoperability.

BACKGROUND

A distributed ledger may include a consensus of replicated and synchronized digital data across multiple nodes. Participants of a distributed ledger may apply an agreed upon protocol for, verifying, storing, and maintaining, and modifying information stored in the distributed ledger. In many examples, a distributed ledger may be implemented by way of one or more blockchains implemented in a peer-to-peer network. The unique protocol, technologies, and other design considerations of a particular distributed ledger may inhibit cohesive sharing, synchronization, and/or transferring of information with other distributed ledgers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
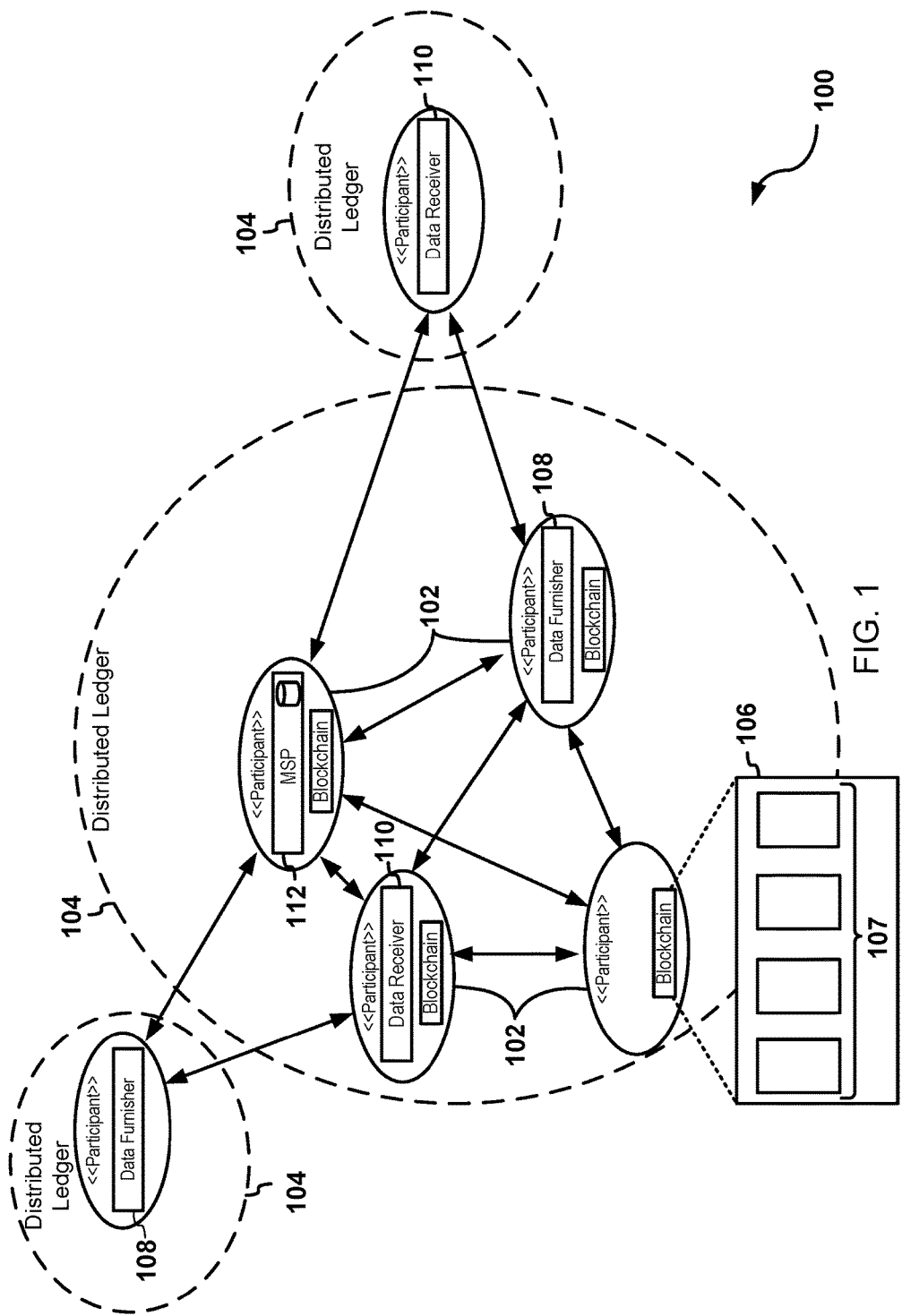
FIG. 1 illustrates a first example of an interoperable cryptologic blockchain system.

A distributed ledger technology (DLT) may apply an agreed upon protocol for interaction with a blockchain. The unique protocol, technologies, and other design considerations of a particular distributed ledger may inhibit cohesive sharing, synchronization, and/or transferring of information with other distributed ledgers and/or non-participants. In some examples, sharing between distributed ledgers may occur by a computing device becoming a participant of each of the distributed ledgers. However, as more and more distributed ledger technologies become ubiquitous among various organizations, participation in multiple distributed ledger networks to provide data sharing, transferring, and synchronization between the distributed ledger networks may become cumbersome, inefficient, or otherwise undesirable.

Accordingly, there is disclosed digital systems and methods for cryptological blockchain interoperability. By way of an introductory example, a data furnisher of a furnisher DLT network may append, to a furnisher blockchain, an interoperability smart contract comprising a cryptologic committal. The cryptologic committal may include commit logic configured to cause a data receiver to commit token data to the receiver blockchain based on the pre-commit authorization. The data furnisher may encrypt, based on a predetermined committal key, a pre-commit authorization to transfer token data stored on the furnisher blockchain to the receiver blockchain. The data furnisher may transmit the pre-commit authorization to the data receiver. After transmission of the pre-commit authorization, the data furnisher may receive a pre-commit acknowledgement of the pre-commit authorization. Responsive to the pre-commit acknowledgement, the data furnisher may lock the token data on the furnisher blockchain in response to verification that the token data is appended to the receiver blockchain. Alternatively, the data receiver may create and/or commit the token data to the receiver blockchain in response to verification that the token data is locked on the furnisher blockchain. The data furnisher may send the predetermined committal key to the data receiver. The data receiver may be configured to execute the commit logic based on the pre-commit authorization unencrypted by the predetermined committal key and commit the token data to the receiver blockchain based on the commit logic.

In another aspect of the system and method described herein, a data receiver of a receiver DLT network may receive an encrypted pre-commit authorization to transfer token data stored on a furnisher blockchain to a receiver blockchain. The data receiver may access, from the receiver blockchain, an interoperability smart contract comprising a cryptologic committal. The cryptologic committal may include commit logic configured to cause committal of the token data to the receiver blockchain based on the pre-commit authorization. The data receiver may generate the token data. The data receiver may transmit a pre-commit acknowledgement to a data furnisher in response to generation of the token data. After transmission of the pre-commit authorization, the data receiver may receive a committal key from the data furnisher, unencrypt the pre-commit authorization, and commit the token data to the receiver blockchain based on the unencrypted pre-commit authorization and the cryptologic committal.

One example of a technical advancement achieved by the systems and methods described herein may be that information may be shared and/or exchanged between blockchains on various DLT networks while compliance with the DLT networks is maintained. The participants of each DLT network may adhere to interoperability protocol(s) that increases speed, security, and veracity of information shared or transferred between various public or private DLT networks. For example, an interoperability smart contract may provide cryptological instructions for committal locking and/or transferring information between DLT networks.

Another technical advancement of the systems and methods described below may be that coupling of distributed ledger technologies is minimized while cohesion between distributed ledger technologies is maximized. For example, participants of each of the DLT networks may validate information exchanged between the DLT networks without a gateway node between the DLT Networks and a smart contract may arbitrate communication between DLTs. Information may be shared and/or exchanged between blockchains of the DLT networks even when the rules, protocols, and/or technology of the each of the DLT networks is different.

An additional technical advancement achieved by the system and methods described below is that token data may be synchronously transferred between two independent DLT networks in a manner that increases network efficiency, decreases processing time, and decreases memory requirements. For example, participants of multiple DLT networks may access a common set of criteria for exporting information that reduces the overall amount of network communications, cross validation, network traffic, and/or processing time. Additional benefits, efficiencies, and improvements over existing market solutions are made evident in the systems and methods described below.

FIG. 1 illustrates a first example of an interoperable cryptologic blockchain system 100. The system 100 may include one or more blockchain participants 102 that participate in a DLT network 104. The blockchain participants 102 may include full or partial nodes of the DLT network 104. For example, each of the blockchain participants 102 may store and/or interact with a complete or partial copy of a blockchain 106 compliant with a DLT. The DLT network 104 may include a combination of the blockchain participants 102 that respectively communicate with a locally stored blockchain via a protocol for the DLT.

The DLT network may include the participants of the DLT network that access a blockchain 106, or blockchains. The blockchain 106 may include datablocks 107 that are linked according to a cryptography. The arrangement of data blocks and associations between information stored in the data blocks are established by a DLT. For example, the blockchain 106 may provide a growing, shared digital data flow, which serves as the source of truth between the blockchain participants 102. Depending on the DLT, the datablocks 107 of the blockchain 106 may include a genesis datablock that is the initial datablock of the blockchain 106. Successive datablocks may be appended to the blockchain 106 over time. The blockchain 106 may provide a chronological ledger of information. One or more of the successive datablocks may include a hash of a previous datablock. Modifications to one or more datablocks in the blockchain 106 may cause inconsistencies in the hashed information stored in the successive datablocks. The inconsistencies may be detected and the blockchain participants 102 of the DLT network 104 may prevent modification to previously appended or existing information in the blockchain 106. In some distributed ledgers, modifications to the blockchain 106 may be prohibited unless a majority, or some other predefined number, of the blockchain participants 102 consent to the modifications.

In some examples, the blockchain 106 may include token data. As described herein, token data may refer to asset data stored on a blockchain. Token data may have various types. For example, token data may include native assets, programmed assets and/or other objects types applicable in DLT. Native assets (such as, crypto-currency coins, hard tokens, native token, and/or other spendable assets) may be compliant with a particular distributed ledger.

Programmed assets may include code, scripts, smart contracts, or other non-spendable and/or non-native token data. Programmed assets may be replicated and their state can be kept consistent where the underlying logic (e.g., in the case of code or scripts) is independent resources or environment factors particularized to a specific DLT. For example, code written in a language native to a first DLT may be transferred to a second DLT with a second, different native language where the logical structure of the code may be translated to the second native language or emulated within the environment of the second DLT.

Additionally or alternatively, programmed assets may be transferable where a particular order of events does not affect the state of the programmed asset. DLTs may resolve disagreements in event sequences through consensus. However, consensus on one DLT may be independent of consensus on a second. Accordingly, different DLTs may not necessarily agree upon a common order for the same events because the DLTs may represent independent consensus regions. Therefore, for an order-dependent programmed asset, the state of the asset on a first DLT may not necessarily inform the proper state for the order-dependent programmed asset on another DLT. In some cases, a portion of an order-dependent programmed asset may be order independent.

At least one of the blockchain participants 102 may include a data furnisher 108. The data furnisher 108 may furnish particular information stored in the blockchain 106 to one or more receivers external to the DLT network 104. In some examples, the data furnisher 108 may be authorized to access and/or manage particular information stored in the blockchain 106. Alternatively or in addition, the data furnisher 108 may provide a human or non-human entity with access to the DLT network 104. In some examples, the DLT network 104 may include one data furnisher. Alternatively, the DLT network 104 may include multiple data furnishers.

The data receiver 110 may include a non-participant of the DLT network 104. Alternatively or in addition, the data receiver 110 may include a participant of a separate DLT network (See FIG. 2 for an example). Unlike the data furnisher 108, the data receiver 110 may not have access to the blockchain 106 for the DLT network 104. The data receiver 110 may receive the token data stored in the blockchain 106 from one or more blockchain participants 102, such as the data furnisher 108.

In some examples, at least one of the blockchain participants 102 may further include a membership service provider 112. The membership service provider 112 may provide access to the identities and cryptological information associated with the blockchain participants 102 of the DLT network 104. Alternatively or in addition, the membership service provider 112 may provide the identities of participants and non-participants of the DLT network 104. For example, the membership service provider 112 may receive identification information and public key information provided by the data furnisher 108 and/or the data receiver 110.

The membership service provider 112 may include a membership service repository 114. The membership service repository 114 may include a database or memory that stores the identities and cryptological information associated with participants and non-participants of the DLT network 104. For example, the membership service repository 114 may include associations between the identities and the cryptological information. The identities may include IP addresses, MAC addresses, host names, user names, and/or any other information that identifies a participant or non-participant of the DLT network 104. The cryptological information may include any information that is used to ensure the authenticity of a digital signature. For example, the cryptological information may include a public key that corresponds to a private key that is applied to generate a digital signature.

In some examples, the data furnisher 108 and/or the data receiver 110 may communicate with the membership service provider 112 to receive the public key of the data furnisher 108 or multiple data furnishers. In some examples, the data receiver 110 may submit a message or query to the membership service provider 112. After receiving one or more public key, the data receiver 110 may verify the truth of token data shared by or exported from the DLT network 104. For example, the data receiver 110 may receive authorization information from the data furnisher 108 (or some other participant of the DLT network 104. The authorization information may include a digital signature corresponding to the token data. The digital signature may include a certification that the data furnisher 108 and/or data receiver 110 consents to a particular action, such as exporting token data. The signer of the digital signature may be confirmed based on the public key that is paired with the private key used to sign the signature.

In many circumstances, it may be desirable to share token data stored in the blockchain 106 with external entities, such as the data receiver 110, without adding participants to the DLT network 104. In the example illustrated in FIG. 1, sharing and/or exporting information to/with the data receiver 110 presents technical challenges. Among other challenges described here, the technical challenges may include the ability for the data receiver 110 to verify that the token data is valid and authorized for sharing/export, preventing double spend between the blockchain participants 102 of the DLT network 104 and non-participants, and ensuring synchronization of the token data between participants of the DLT network 104 and non-participants of the DLT network 104.

Figure 2:
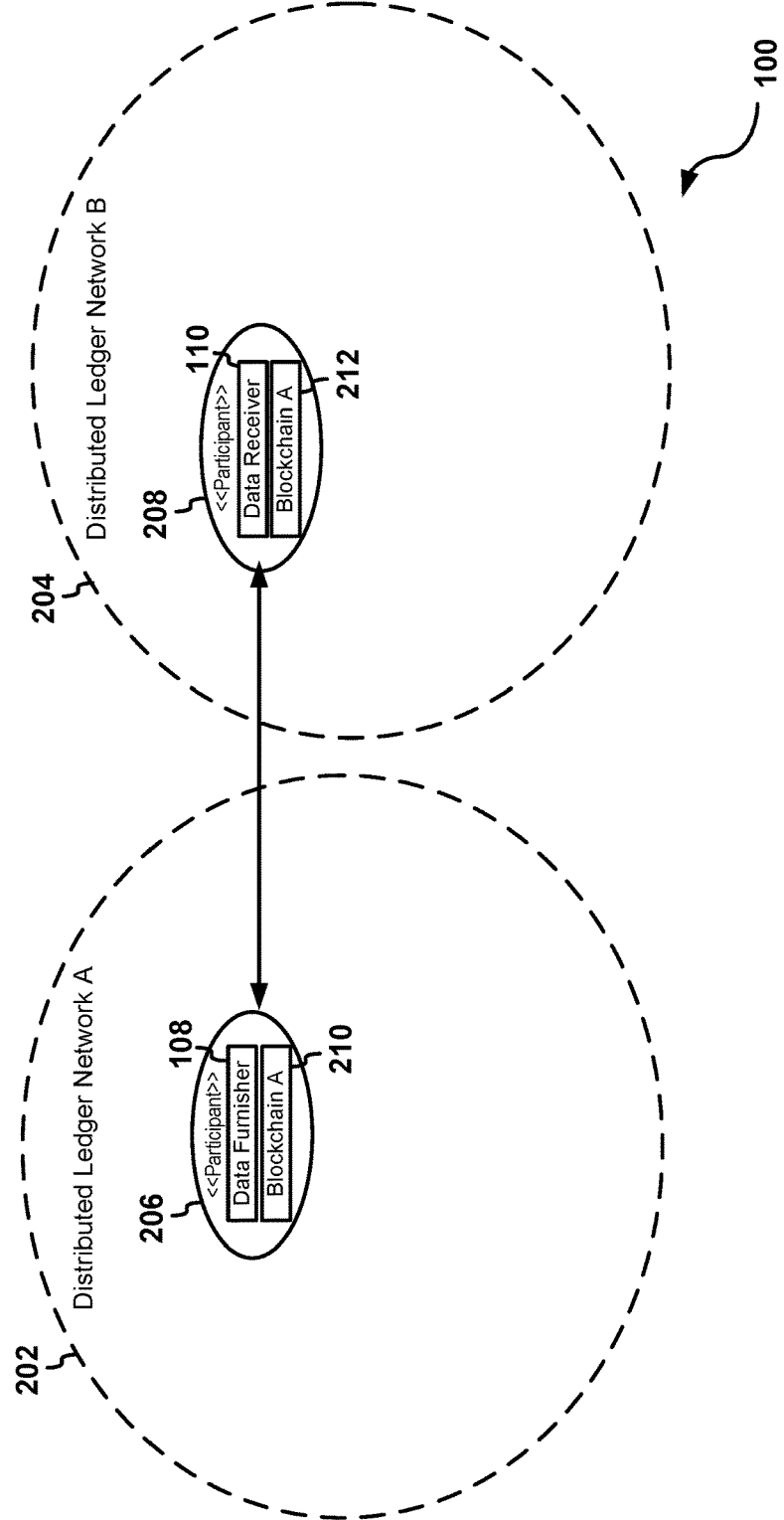
FIG. 2 illustrates a second example of an interoperable cryptologic blockchain system.

FIG. 2 illustrates a second example of the interoperable cryptologic blockchain system 100. In some examples, the system 100 may include a furnisher DLT network 202 and/or a receiver DLT network 204. The furnisher DLT network 202 and/or the receiver DLT network 204 may each be examples of the DLT network 104 illustrated in FIG. 1. For ease of explanation, the furnisher DLT network 202 is referred to herein as a DLT network with a participant that exports token data to the receiver DLT network 204. In other examples, the furnisher DLT network 202 may receive token data exported from the receiver DLT network 204.

The furnisher DLT network 202 may include a furnisher participant. The furnisher participant 206 as used herein may refer to at least one of the participants 102 (FIG. 1) that includes and/or accesses the data furnisher 108. The receiver DLT network 204 may include a receiver participant 208. The receiver participant may include an example of a participant that includes and/or accesses the data receiver 110. The furnisher DLT network 202 is illustrated in FIG. 2 with one participant, but the furnisher DLT network 202 may, in other examples, include multiple participants that include respective data furnishers. Likewise, the receiver DLT network 204 may include multiple participants that include respective data receivers.

The data furnisher 108 may store and/or access a furnisher blockchain 210. The data receiver 110 may store and/or access a receiver blockchain 212. The furnisher blockchain 210 and the receiver blockchain 212 may each be managed and maintained according to the respective DLT for each DLT network. The DLT for the furnisher DLT network 202 may be different than the DLT for the receiver DLT network 204.

The data furnisher 108 may share and/or export token data with the data receiver 110. In some examples, multiple participants of the furnisher DLT network 202 may have an interest in the token data. The data receiver 110 may determine whether all data furnishers have agreed to share or export the token data from the furnisher DLT network 202. The data receiver 110 and the data furnisher 108 may apply cryptological security to ensure the secure, authorized, and synchronized transferring of information between DLT networks. For example, the data furnisher 108 and/or other participants of the furnisher DLT network 202 may each generate a digital signature based on a private key and public key pair.

In some examples, the one or more participants of the furnisher DLT network 202 may include a furnisher Membership Service Provider (MSP). Alternatively or in addition, one or more participants of the receiver DLT may include a receiver MSP. The furnisher MSP and the receiver MSP may exchange the public keys and/or identities of the participants of each respective DLT network. The furnisher MSP may store the public keys and/or identities of participants of the furnisher DLT network 202 and the receiver DLT network 204. The receiver MSP may or store the public keys and/or identities of participants of the receiver DLT network 204 and the furnisher DLT network 202.

In some examples, the furnisher DLT network 202 and/or the receiver DLT network 204 may apply a consensus protocol to reach a consensus regarding authorized sharing and/or authorized exporting of information between DLT networks. For example, multiple participants of the furnisher DLT network 202 may have an interest in data being shared or exported from the furnisher DLT network 202. Alternatively or in addition, multiple participants of the receiver DLT network 204 may have an interest in data received by the receiver DLT network 204. In an example, the participants of the furnisher DLT network 202 may include, for example, branches of a bank that wish to transfer digital currency. The participants of the receiver DLT network 204 may include participants that wish to receive digital currency from the furnisher DLT network 202. The bank branches of the furnisher DLT network 202 may reach consensus before transferring the digital currency to one or more bank branches of the receiver DLT network 204. Alternatively or in addition, the bank branches of the receiver DLT network 204 may wish to reach consensus on receiving the digital currency.

In some examples, it may be desired to ensure that the token data is successfully and properly re-created by the receiver DLT before the token data is locked on the furnisher blockchain. Alternatively or in addition, consensus among participants of the furnisher DLT network 202 and participants in the receiver DLT network 204 may be a precondition to transferring token data between DLT networks. Accordingly, the committing the token data to the receiver blockchain 212 and locking the token data on the furnisher blockchain 210 may be synchronized and performed according to an interoperability smart contract 304.

Figure 3:
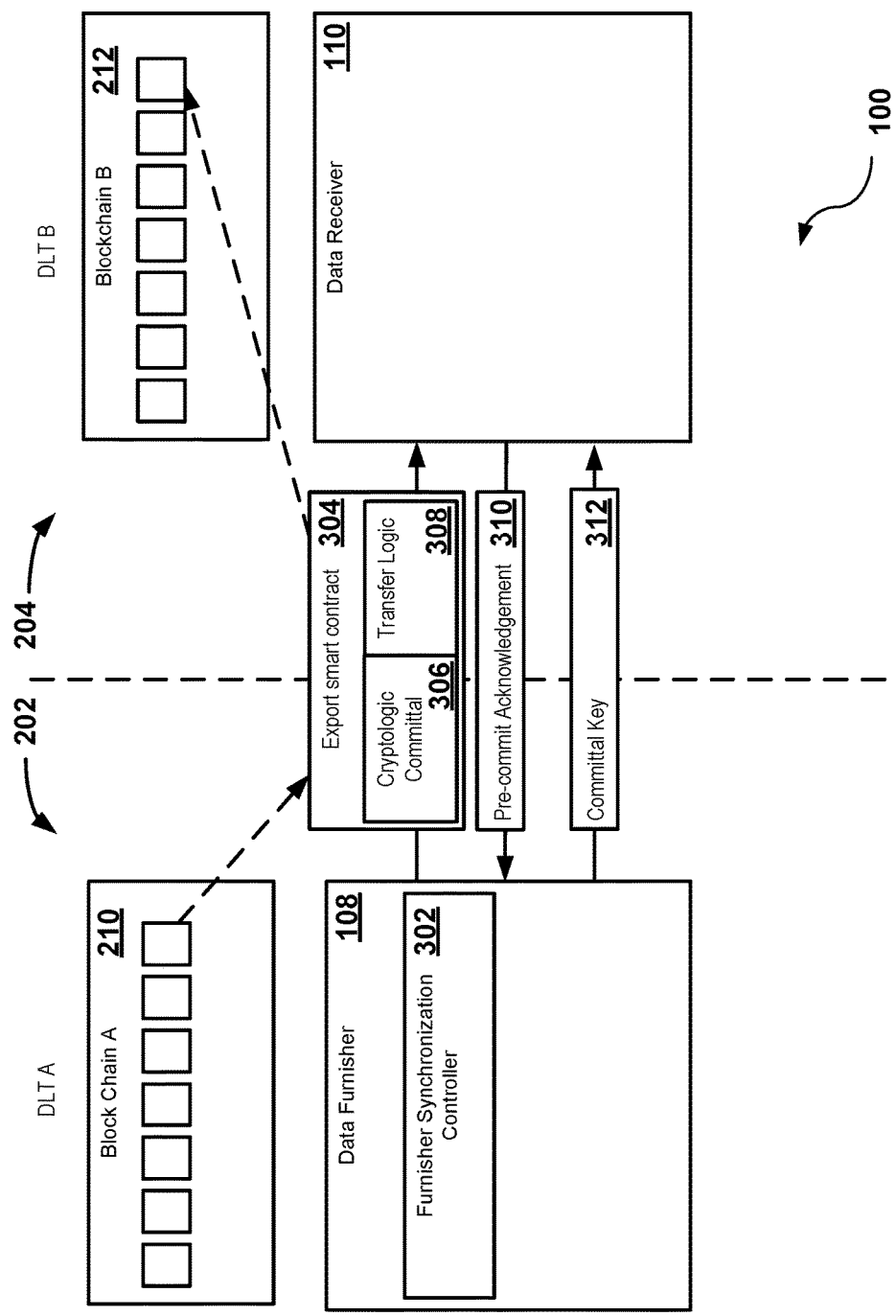
FIG. 3 illustrates a first example of the data furnisher 108 and data receiver for a system.

FIG. 3 illustrates a first example of the data furnisher 108 and data receiver 110. The data furnisher 108 may have access to the furnisher blockchain 210 and the data receiver 110 may have access to the receiver blockchain 212. The data furnisher 108 may export token data to the data receiver 110. In some examples, exportation of token data may involve token data on the furnisher blockchain 210 and/or committing the token data to the receiver blockchain 212. In many examples, various preconditions, authorizations, and data manipulation may occur before the token data may be locked on the furnisher blockchain 210 and/or committed to the receiver blockchain 212. Moreover, locking the token data without committing the token data, or vice versa, may result in race conditions and/or a loss of ledger history for the token data.

The data furnisher 108 may include a furnisher synchronization controller (FSC) 302. The FSC 302 may coordinate transfer and exportation of token data to a remote blockchain. For example, the FSC 302 may communicate token data stored on the furnisher blockchain 210 to the data receiver 110 for storage on the receiver blockchain 212. Alternatively or in addition, the FSC 302 may determine when a successful transfer is completed and lock the token data on the furnisher blockchain 210.

Locking the token data may refer to adding a data block to the furnisher blockchain 210 in accordance with the furnisher DLT. The datablock may indicate that the token data is locked. The data furnisher 108, and/or other participants of the furnisher DLT network 202, may restrict certain information from being appended to the furnisher blockchain 210 in response to the token data being locked. Alternatively or in addition, the participants of the furnisher DLT network 202 may invalidate additional datablocks comprising update information corresponding to the token data.

The FSC 302 may access an interoperability smart contract 304 to determine the criteria, conditions, and parameters that dictate exportation of token data between DLT networks. The interoperability smart contract 304 may include an authorization to transfer data stored on the furnisher blockchain 210 according to a protocol for asynchronous communication between the furnisher DLT network 202, the receiver DLT network 204, and/or other DLT networks. The interoperability smart contract 304 may include terms, conditions, logic, and other information that the data furnisher 108 and the data receiver 110 agree to. In some examples, the interoperability smart contract 304 may include identifiers corresponding to the token data in the furnisher blockchain 210. Alternatively or in addition, the interoperability smart contract 304 may include identifiers of one or more data furnisher and/or one or more data receiver 110 that consent to the export.

In some examples, the interoperability smart contract 304 may include a cryptologic committal 306. The cryptologic committal 306 may include commit logic configured to cause the data receiver 110 to commit the data to the receiver blockchain 212. In general, token data may be considered committed when the token data is appended to the receiver blockchain 212. Alternatively or in addition, token data may be considered committed to the receiver blockchain 212 when the token data is appended to the receiver blockchain 212 and after ownership of the token data is recorded on the receiver blockchain 212. For example, the token data may be created on the receiver blockchain 212 but not considered committed until a commit record is added to the receiver blockchain 212. The commit record may identify the participants, DLT networks, token data, and/or any other information that records the transfer event.

The interoperability smart contract 304 may further include transfer logic 308. The transfer logic 308 may include logic configured to cause the data receiver 110 to receive, generate, and/or append the token data to the receiver blockchain 212. For example, the transfer logic 308 may include instructions to require or validate information received by the data receiver 110. In some examples, the transfer logic 108 may determine whether, according to predetermined rules, valid token data is received by the data receiver. Alternatively or in addition, the transfer logic 308 may cause the data receiver 110 to re-create the token data in a manner that is compliant with the receiver DLT. For example, the receiver DLT may impose a protocol that defines data structure and rules for communicating, updating, and/or interacting with the receiver blockchain 212. The transfer logic 308 may re-generate the token data into a new format that retains the same information, but organized for compliance with the receiver DLT. For example, the transfer logic may include or define a data structure. The data structure may organize information in a format expected by the receiver DLT. The data furnisher 108 may recreate the token data based on the transfer logic prior to sending the data to the data receiver. Alternatively, the data receiver may recreate the data based on the transfer logic after receiving the token data. In some examples, the transfer logic 308 may append the token data to the receiver blockchain 212 for compliance with the receiver DLT.

The FSC 302 may receive a pre-commit acknowledgement 310. The pre-commit acknowledgement 310 may include a verification that the token data was successfully received and/or generated by the data receiver 110. Alternatively or in addition, the pre-commit acknowledgement 310 may indicate that the token data was successfully appended to the receiver blockchain 212. In some examples, the pre-commit acknowledgement 310 may include digital signatures signed by one or more data receivers. For example, the one or more data receiver 110 may be identified in the interoperability smart contract 304. The digital signatures may verify that the data is properly re-generated and/or added to the receiver blockchain 212 in compliance with the receiver DLT and/or the criteria of the interoperability smart contract 304.

To synchronize the locking and committal of the token data transferred between DLT networks, the FSC 302 may encrypt the interoperability smart contract 304, or portions thereof, such that the data receiver 110 is initially receives the interoperability smart contract 304 without the ability to perform the commit according to the committal logic. Alternatively or in addition, the FSC 302 may encrypt information that the interoperability smart contract 304 accesses to perform the committal. For example, the FSC 302 may encrypt the cryptological committal, other portions of the interoperability smart contract 304, or information provided to the interoperability smart contract 304 based on a hash function and a committal key 312. In response to receipt of the pre-commit acknowledgement 310, the FSC 302 may communicate the committal key to the data receiver 110. The data receiver 110 may decrypt the interoperability smart contract 304, or other authorization provided to the interoperability smart contract 304, and perform the committal according the committal logic.

Figure 4:
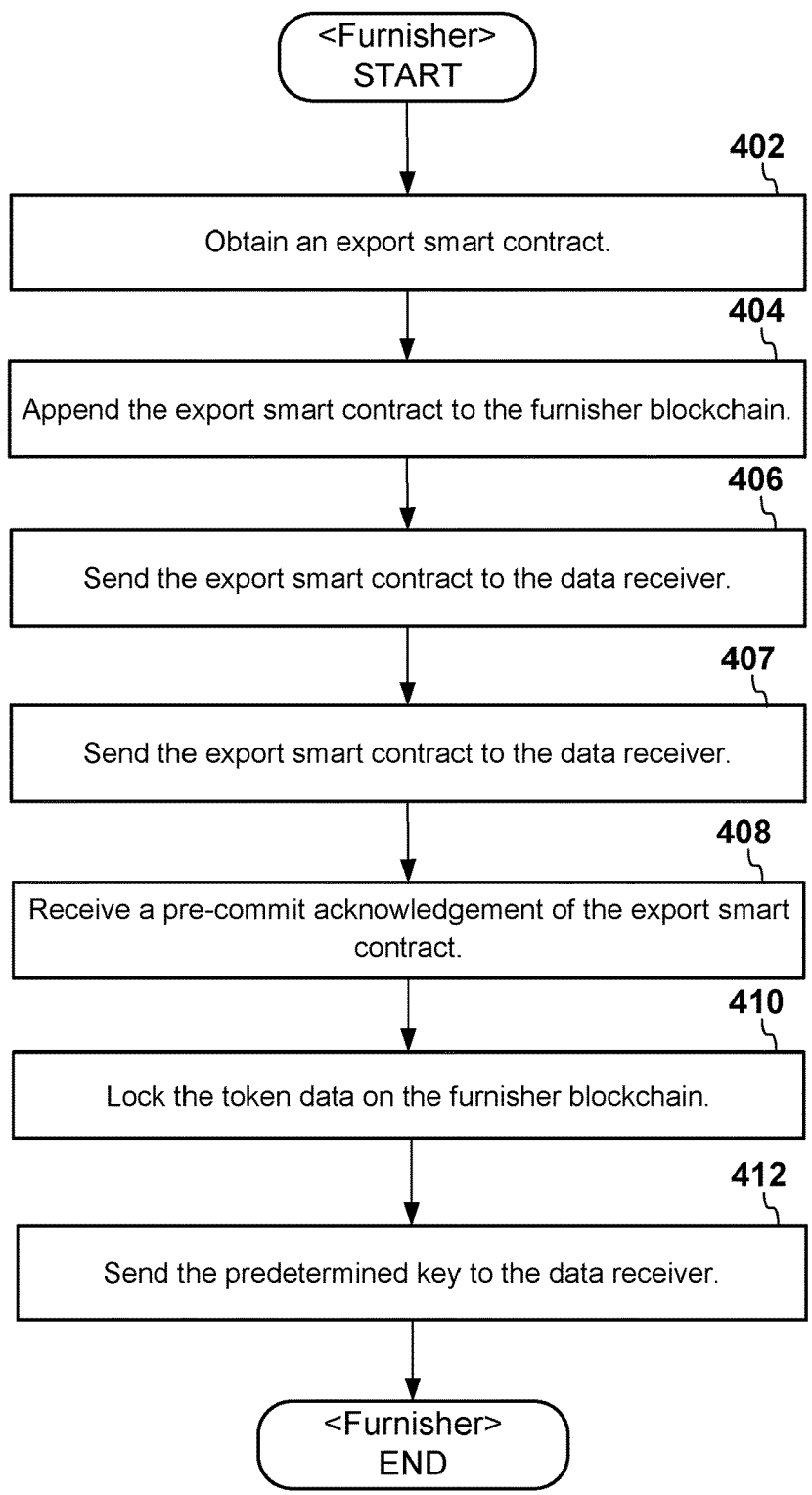
FIG. 4 illustrates a first flow diagram for example logic of a system.

FIG. 4 illustrates a first flow diagram for example logic of the system 100. The FSC 302 may obtain an interoperability smart contract 304 (402). The interoperability smart contract 304 may include the cryptologic committal 306, as previously discussed in reference to FIG. 3. The interoperability smart contract 304 may include commit logic configured to cause the data receiver 110 to commit the token data to the receiver blockchain 212. The commit logic and/or the interoperability smart contract 304 may be encrypted based on a predetermined committal key 312.

The FSC 302 may append the interoperability smart contract 304 to the furnisher blockchain 210 (404). For example, the FSC 302 may add a datablock to the furnisher blockchain 210 that includes the interoperability smart contract 304. The datablock may further include a hash of a previous datablock stored on the blockchain.

The FSC 302 may send the interoperability smart contract 304 to the data receiver (406). For example, the FSC 302 may send the interoperability smart contract 304 to the data receiver 110 and/or another participant of the receiver DLT network 204 (407). In some examples, the FSC 302 may send the token data with the interoperability smart contract 304. Alternatively, the transfer logic 308 of the interoperability smart contract 304 may include instructions configured to regenerate the token data.

The FSC 302 may receive the pre-commit acknowledgment of the interoperability smart contract 304 (408). In response to the pre-commit acknowledgement, the FSC 302 may lock the data on the furnisher blockchain 210 (410). The FSC 302 may send the committal key 312 to the data receiver 110, or some other participant of the receiver DLT network 204 (412). As described in reference to FIGS. 5-6, the data receiver 110 may unencrypt the cryptological committal and perform the committal in response to receipt of the committal key 312.

Figure 5:
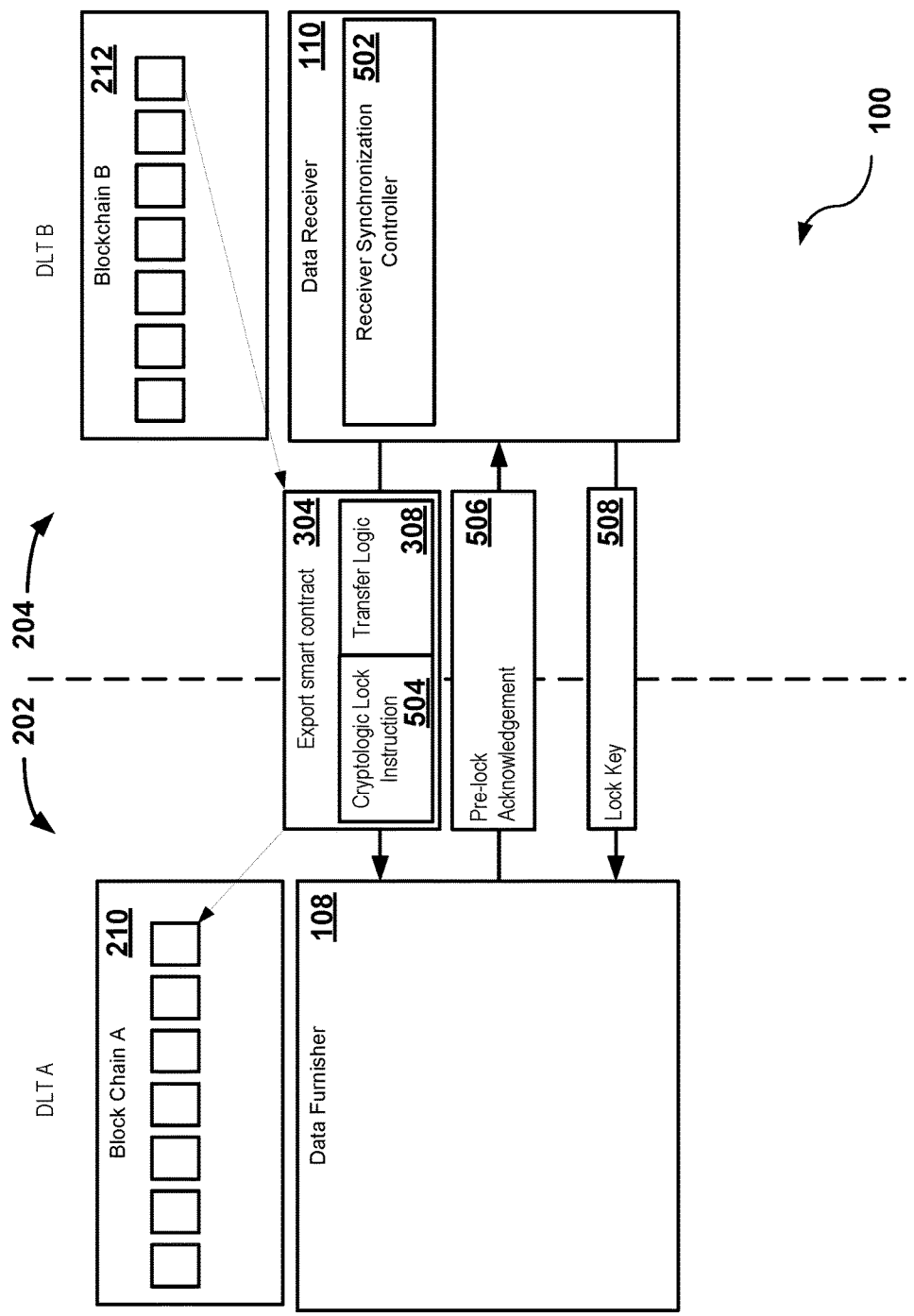
FIG. 5 illustrates a second example of a data furnisher and a data receiver for a system.

FIG. 5 illustrates a second example of the data furnisher 108 and data receiver 110. The data receiver 110 may include a receiver synchronization controller (RSC) 502. The RSC 502 may coordinate transfer and importation of token data from a remote blockchain. For example, the RSC 502 may receive token data stored on the furnisher blockchain 210 from the data furnisher 108 for storage on the receiver blockchain 212. Alternatively or in addition, the RSC 502 may determine when a successful transfer is completed and commit the token data to the receiver blockchain 212.

In some examples, the interoperability smart contract 304 may include a cryptologic lock instruction 504. The cryptologic lock instruction 504 may be included in the export contract 304 in addition to, or in alternative to, the cryptologic committal 306 described in FIG. 3. The cryptologic lock instruction 504 may include lock logic configured to cause the data furnisher 108 to lock the token data on the furnisher blockchain 210.

In some examples, the interoperability smart contract 304 and/or the receiver DLT may include certain pre-conditions that define when and/or how token data may be committed to the receiver blockchain 212. The RSC 502 may receive a pre-lock acknowledgment 506. The pre-lock acknowledgement 506 may include a verification that various preconditions for committing the token data to the receiver blockchain 212 have been satisfied according to the interoperability smart contract 304. Alternatively or in addition, the pre-lock acknowledgement may indicate that the data furnisher 108 is prepared to lock the token data on the blockchain. For example, the pre-lock acknowledgement may indicate that one or more data furnishers of the furnisher DLT network 202 have reached consensus that the token data was successfully recreated and/or generated by the data receiver 110. Alternatively or in addition, the pre-lock acknowledgement may indicate that the token data that the data furnisher 108 acknowledges that the DLT network may assume ownership of the token data. In some examples, the pre-lock acknowledgement may include digital signatures signed by one or more data furnisher 108. For examples, the one or more data furnisher 108 may be identified in the interoperability smart contract 304. The digital signatures may verify that the data furnishers agree to lock the token data on the furnisher blockchain 210.

The RSC 502 may encrypt the cryptologic lock instruction 504 such that the data furnisher 108 receives the cryptologic lock instruction 504 without the initial ability to perform the lock according to the lock instruction 504 and/or the interoperability smart contract 304. For example, the RSC 502 may encrypt the cryptologic lock instruction 504, and/or other portions of the interoperability smart contract 304, based on a hash function and a lock key 508. In response to receipt of the pre-lock acknowledgement 506, the FSC 302 may communicate the lock key 508 to the data furnisher 108. The data furnisher 108 may decrypt the cryptologic logic instruction based on the lock key 508.

Figure 6:
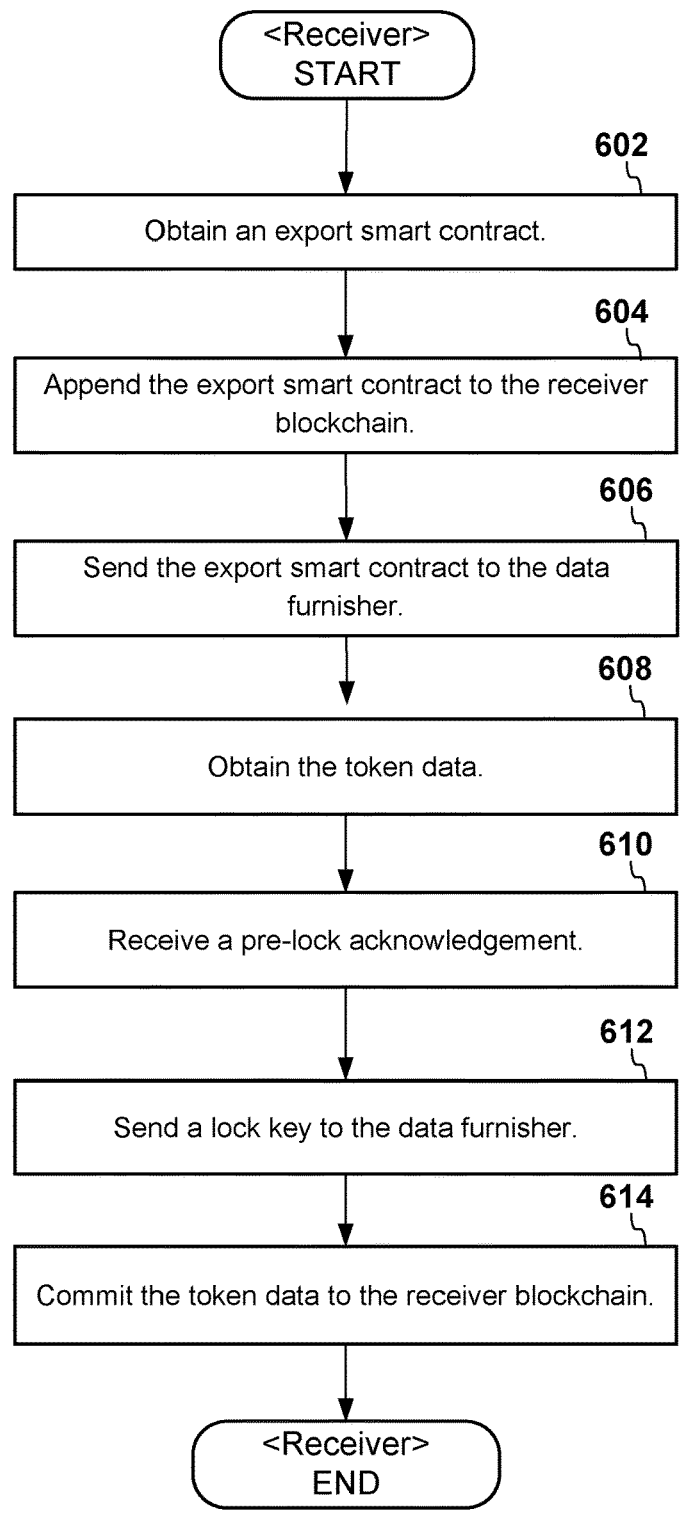
FIG. 6 illustrates a second flow diagram for example logic of a system.

FIG. 6 illustrates a second flow diagram for example logic of the system 100. The RSC 502 may obtain the interoperability smart contract 304 (602). For example, the RSC 502 may receive the interoperability smart contract 304 from the data furnisher 108. Alternatively or in addition, the RSC 502 may receive the interoperability smart contract 304 from some other source and then communicate the interoperability smart contract 304 to the data furnisher 108. In some examples, the interoperability smart contract 304 may have been previously appended to the receiver blockchain 212, and the RSC 502 may obtain the interoperability smart contract 304 from the receiver blockchain 212.

The RSC 502 may append the interoperability smart contract 304 to the receiver blockchain 212 (604). For example, the RSC 502 may append a datablock to the receiver blockchain 212 that includes the interoperability smart contract 304 and a hash to a previous datablock. In some examples, the RSC 502 may determine whether various participants of the receiver DLT network 204 consent to the export. For example, the interoperability smart contract 304 may identify various authorizing participants of the receiver DLT network 204. The RSC 502 may determine whether the identified participants consent to the export. For example, the RSC 502 may obtain digital signatures corresponding to one or more participants that consent to the interoperability smart contract 304 and append the digital signatures to the receiver blockchain 212.

The RSC 502 may send the interoperability smart contract to the data furnisher 108 (606). Alternatively or in addition, the RSC 502 may obtain the token data (608). For example, the transfer logic 308 included in the interoperability smart contract 304 may have logic for validating, generating, and/or committing the token data, as discussed in reference to FIG. 3. The RSC 502 may execute and/or perform the transfer logic 308 to generate or recreate the token data. In other examples, the data furnisher 108 may communicate the token data to the RSC according to the transfer logic 308 of the interoperability smart contract 304.

The RSC 502 may receive the pre-lock acknowledgement (610). In response to receipt of the pre-lock acknowledgement 506, the RSC 502 may determine whether the acknowledgement complies with the interoperability smart contract 304. For example, the RSC 502 may determine whether one or more participants of the furnisher DLT have indicated a consensus to lock the token based on participant identifiers included in the interoperability smart contract 304.

The RSC 502 may send the lock key 508 to the data furnisher 108 (612). The lock key 508 may provide a key for locking the token data based on the cryptologic lock instruction 504. For example, the cryptologic lock instruction 504 may be unencrypted based on the lock key 508. In some examples, the RSC 502 may further receive verification that the token data was locked in accordance with the lock instruction 504. For example, the RSC 502 may receive digital signatures from one or more data furnishers that agree the token data is properly locked on the furnisher blockchain 210.

The RSC 502 may commit the token data to the receiver blockchain 212 (614). For example, the RSC 502 may append the token data or committal information to the receiver blockchain 212, as discussed in reference to FIG. 3. In other examples, the data receiver may wait to create the token data until after verification that the token data is locked on the furnisher blockchain. For example, creating the token data may and committing may involve creating the token data on the receive blockchain.

Figure 7:
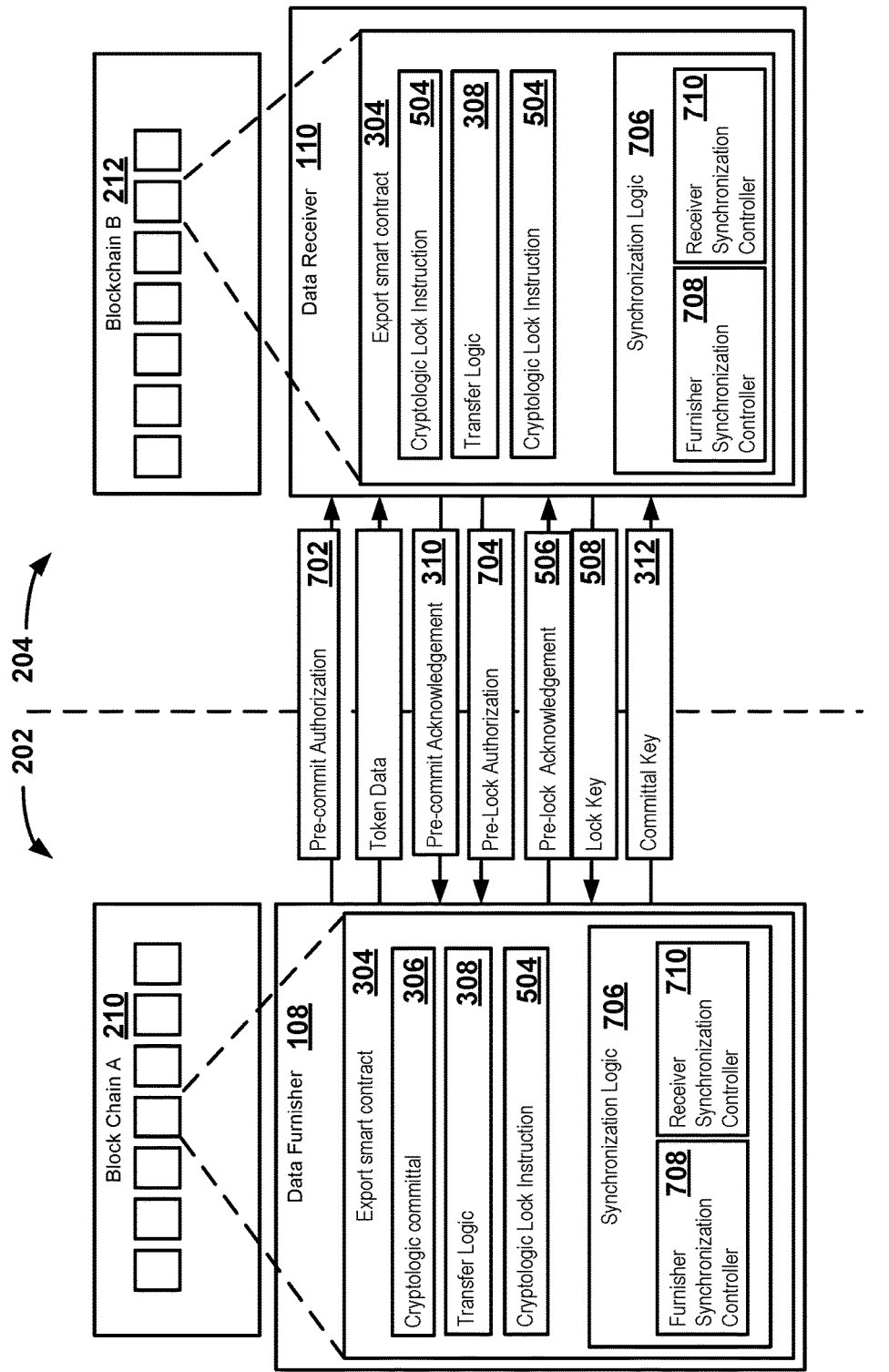
FIG. 7 illustrates a third example of a data furnisher and a data receiver for a system.

FIG. 7 illustrates a third example of the data furnisher 108 and data receiver 110. The interoperability smart contract 304 may be received by participants of respective DLT networks to facilitate exportation of token data between the respective DLT networks. For example, the data furnisher 108 and the data receiver 110 may receive the interoperability smart contract 304. The interoperability smart contract 304 may be appended to the furnisher blockchain 210 and the receiver blockchain 212 so that participants of the respective DLT networks may access and consent to compliance with the interoperability smart contract. The data furnisher 108 and/or the data receiver 110 may access the interoperability smart contract for logic, parameters, and other information that dictates how to export the token data.

The cryptologic committal 306 of the interoperability smart contract 304 may commit the token data to a target blockchain based on one or more authorizations provided by the furnisher DLT network 202. For example, the cryptologic committal 306 may cause the data receiver 110 to commit the token data to the receiver blockchain 212 based on a pre-commit authorization 702 provided to the data receiver 110 by the data furnisher 108.

Alternatively or in addition, cryptologic lock instruction 504 of the interoperability smart contract 304 may cause the data furnisher 108 to lock the token data in response to receipt a pre-lock authorization 704 provided by the receiver DLT network 204. For example, the cryptologic lock instruction 504 may cause the RSC 502 to lock the token data in response to receipt of the digital signatures of one or more data receiver 110 that agree to import the token data or that agree the furnisher DLT is complying with the interoperability smart contract 304.

In some examples, asynchronous exchange of information between the data receiver 110, the data furnisher 108, and/or other participants may be coordinated based on synchronization logic 706. The synchronization logic 706 may include rules, criteria, executable instructions, and other parameters that coordinate the transfer of information between the data furnisher 108 and the data receiver 110. The synchronization logic 706 may define the timing of when the pre-commit authorization 702, the token data, the pre-commit acknowledgement, the pre-lock authorization 704, the pre-lock acknowledgement, the lock key, and/or the committal key are exchanged between the data furnisher and the data receiver.

The data furnisher 108 and the data receiver 110 may communicate with each other according the synchronization logic 706. For example, the synchronization logic 706 may define the timing and conditions in which the pre-commit authorization 702, the token data, the pre-commit acknowledgment 310, the pre-lock authorization 704, the pre-lock acknowledgment 506, the lock key 508, and/or the committal key 312 should be exchanged. In one example, the synchronization logic 706 may specify that the committal key 312 should not be communicated until the token data is locked on the furnisher blockchain. In another example, the synchronization logic 706 may specify that the committal should not occur until after lock key 508 is sent and/or confirmation that the token data locked has been received.

In some examples, the synchronization logic 706 may include the FSC 302, the RSC 502, and/or other examples of synchronization controllers. Accordingly, the interoperability smart contract 304 may be custom tailored for interoperation between two or more DLT networks based on the synchronization logic 706, the transfer logic 308, the cryptologic committal 306, the cryptologic lock instruction 504, and/or any other parameters, criteria, and/or logic included in the interoperability smart contract.

Figure 8:
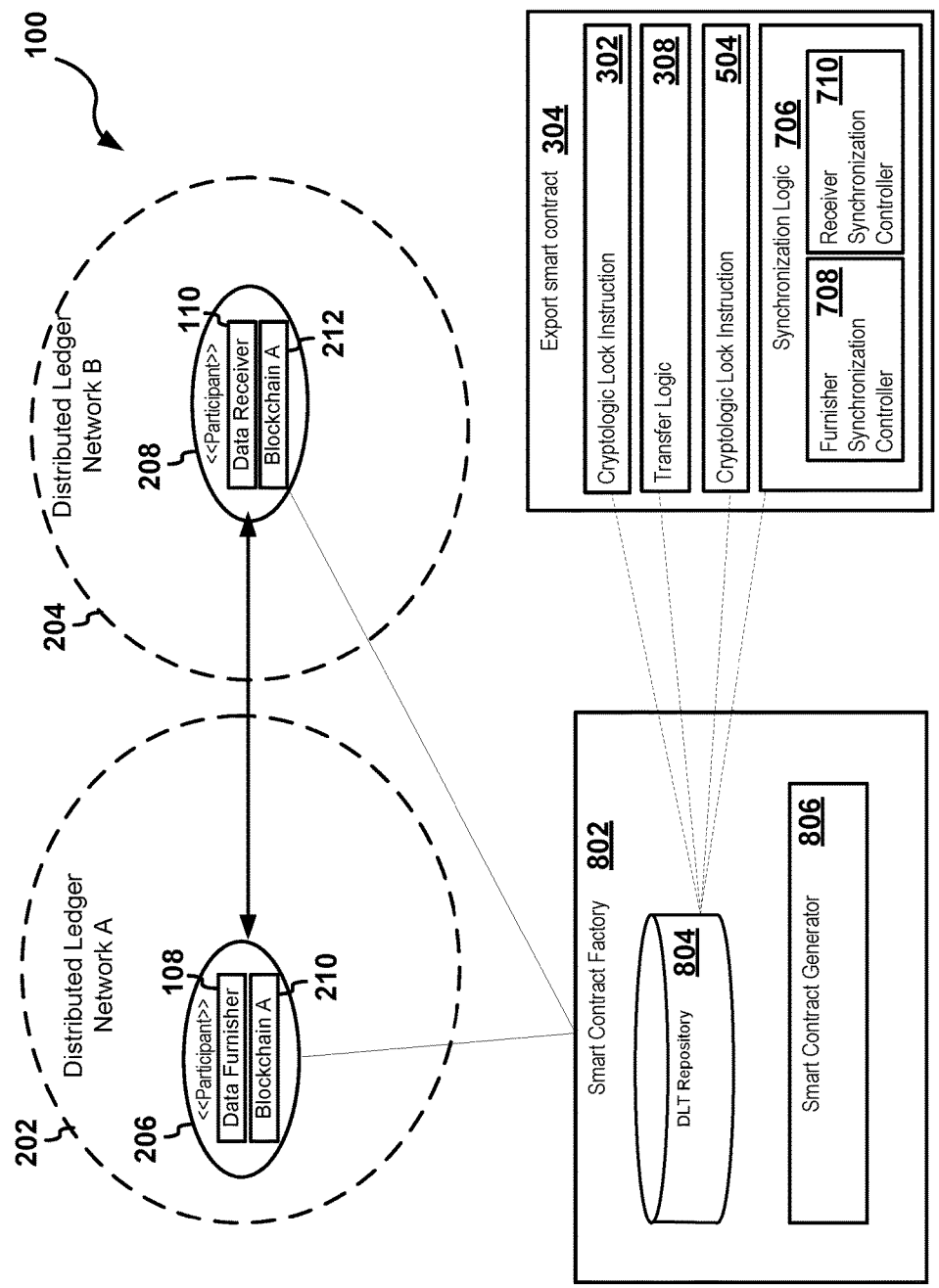
FIG. 8 illustrates an example of a smart contract factory for a system.

FIG. 8 illustrates an example of a smart contract factory 802 for the system 100. The smart contract factory 802 may generate the interoperability smart contract 304 tailored with logic, instruction, parameters, and other information that is compliant with a particular DLT or multiple DLTs. For example, the furnisher DLT network 202 and the receiver DLT network 204 may implement differing DLTs. The smart contract factory 802 may generate the cryptologic committal 306, the transfer logic 308, the cryptologic lock instruction 504, and/or the synchronization logic 706, the FSC 302 and/or the RSC 502 in a manner according to the furnisher DLT and the receiver DLT. Accordingly, the smart contract factory 802 may custom generate the interoperability smart contract 304, according to the DLTs involved in interoperation and/or the underlying token data exported between DLT networks.

The smart contract factory 802 may include a DLT repository 804. The DLT repository 804 may include various sets of logic, rules, criteria, and/or parameters that are compliant with the respective DLTs. For example, the DLT repository may include a table, or some other data structure, that associates the cryptologic committal 306, the lock instruction 504, the transfer logic 308, and/or the synchronization logic 706 with one or more DLT identifiers.

The smart contract factory may further include an interoperability smart contract (ESC) generator 806. The ESC generator 806 may access the DLT repository 804 to generate custom tailored interoperability smart contracts. For example, the ESC generator 806 may receive DLT identifier(s), or other identifying parameters that identify of the furnisher DLT and/or the receiver DLT. The ESC generator 806 may select logic, parameters, criteria, and other information from the DLT repository 804 based on the identifying parameters.

In some examples, the DLT repository 804 may store a plurality of cryptologic committals that are respectively compliant with various DLTs. Alternatively or in addition, the DLT repository 804 may store a plurality of lock instructions, transfer logic, and/or synchronization logic respectively compliant with the various DLT networks. The cryptologic committals, the lock instructions, and/or the transfer logic may be associated in the DLT repository with DLT identifiers.

The ESC generator 806 may access the DLT repository to build and/or compile the interoperability smart contract 304. The interoperability smart contract 304 may include logic that is compliant with the furnisher DLT and/or the receiver DLT. The ESC generator 806 may receive an identifier of the furnisher DLT and/or an identifier of the receiver DLT. The ESC generator 806 select, from the smart contract repository, the cryptologic committal 306 associated with the identifier of the receiver DLT. The ESC generator 806 may select the cryptologic lock instruction 504 associated with the furnisher DLT. The ESC generator 806 may select the transfer logic 308 associated with the identifier of the furnisher DLT and/or the receiver DLT. The ESC generator 806 may select the synchronization logic 706 associated with the identifier of the furnisher DLT and/or the receiver DLT. The ESC generator 806 may generate the interoperability smart contract 304 with logic that interacts with the data receiver 110, the data furnisher 108, the receiver blockchain 212 and/or the furnisher blockchain 210 according to the receiver DLT and the furnisher DLT, respectively.

The ESC generator 806 may be included in or accessible to the data furnisher 108 and/or the data receiver 110. For example, the data furnisher 108 may generate the interoperability smart contract 304 based on the ESC generator 806 and communicate the interoperability smart contract 304 to the data receiver 110. Alternatively, the data receiver 110 may generate the interoperability smart contract 304 based on the ESC generator 806 and communicate the interoperability smart contract 304 to the data furnisher 108. In other examples, some other entity or participant may generate the interoperability smart contract 304 based on ESC generator 806 and communicate the interoperability smart contract 304 to the data furnisher 108 and/or the data receiver 110.

Figure 9:
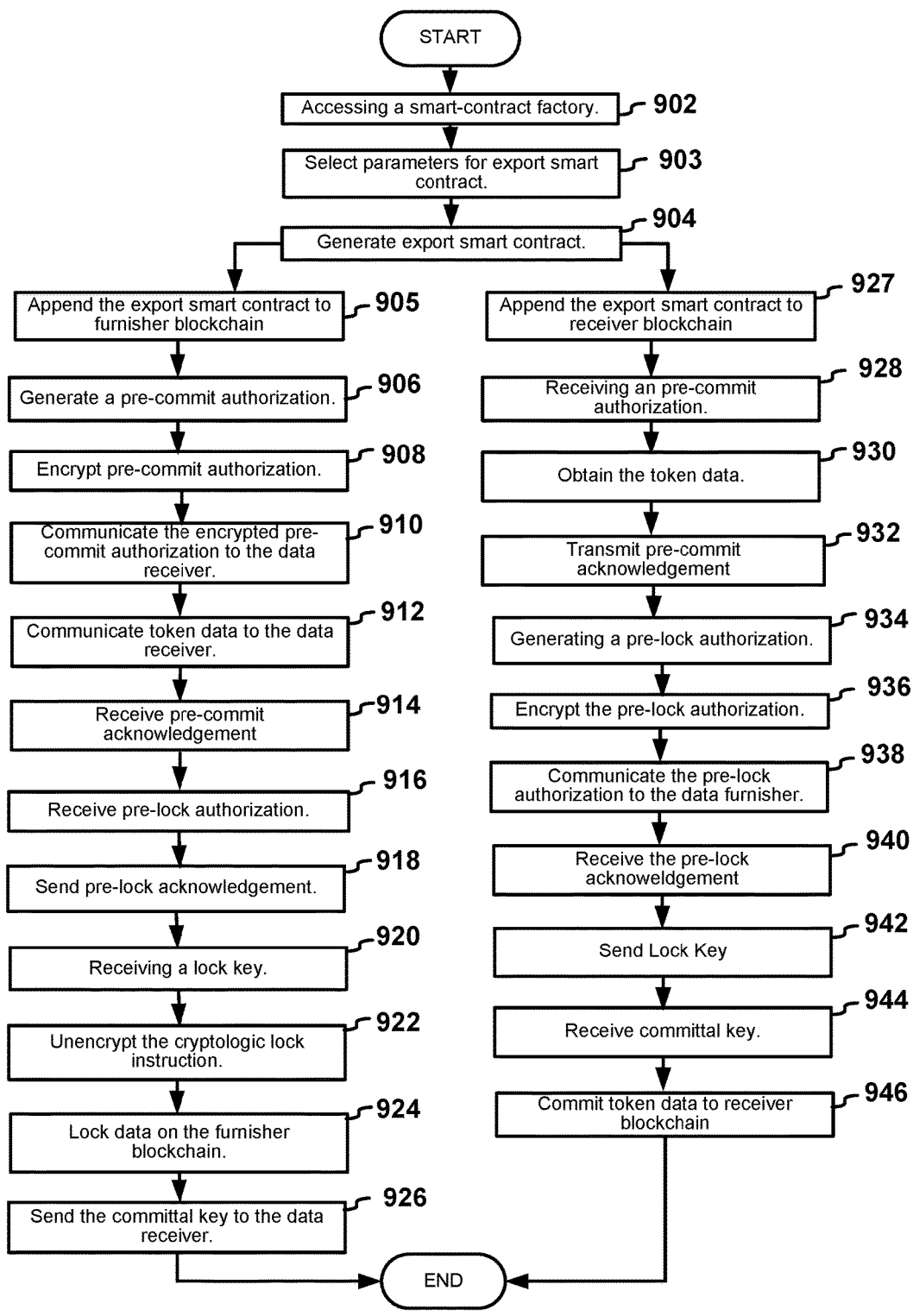
FIG. 9 illustrates a third flow diagram for example logic of a system.

FIG. 9 illustrates a third flow diagram for example logic of the system 100. Reference to FIGS. 7 and 8 are made throughout the discussion of the operations for the example logic. Operations 902-904 are related to generation of the interoperability smart contract 304. Operations 905-926 refer to operations performed by the data furnisher according the interoperability smart contract 304. Operations 927-946 refer to operations performed by the data receiver 110 according the interoperability smart contract 304.

Referring to operations 902-904, the data furnisher 108 and/or the data receiver 110 may access the smart contract factory 802 (902). The data furnisher 108 and/or the data receiver 110 may select the parameters for the interoperability smart contract 304 (903). The smart contract factory 802 may generate the interoperability smart contract 304 (904).

For example, the parameters may include the cryptologic committal 306, the transfer logic 308, the cryptologic lock instruction 504, and/or the synchronization logic 706, the FSC 302 and/or the RSC 502. The smart contract factory 802 may receive an identifier of the furnisher DLT and/or an identifier of the receiver DLT. The ESC generator 806 may select, from the DLT repository 804, the cryptologic committal 306, the transfer logic 308, the cryptologic lock instruction 504, and/or the synchronization logic 706 based on the furnisher DLT identifier and/or the receiver DLT identifier. The smart contract factory 802 may compile the interoperability smart contract 304 such that the interoperability smart contract 304 includes the cryptologic committal 306, the transfer logic 308, the cryptologic lock instruction 504, and/or the synchronization logic 706.

The data furnisher 108 and/or the data receiver 110 may perform the respective operations according to the interoperability smart contract 304. For example, the interoperability smart contract 304 may govern synchronized communications between the furnisher DLT and the receiver DLT.

Referring to operations 905-926, the data furnisher 108 may append the interoperability smart contract 304 to the furnisher blockchain 210 (905). For example, the data furnisher 108 may append a datablock to the furnisher blockchain 210 that includes the interoperability smart contract 304 and a hash to a previous datablock. The data furnisher may generate a pre-commit authorization 702 to the furnisher blockchain 210 (906). The pre-commit authorization 702 may include an authorization to export token data stored on the furnisher blockchain 210 to the receiver blockchain 212. Alternatively or in addition, the pre-commit authorization 702 may include proofs that various conditions, criteria, and rules defined in the interoperability smart contract 304 are satisfied. For example, the pre-commit authorization 702 may include the digital signatures of one or more participant of the furnisher DLT network 202 that agree to export the token data. The data furnisher may append a datablock to the furnisher blockchain 210 that comprises the pre-commit authorization 702 and a hash of a previous datablock.

The data furnisher 108 may encrypt the pre-commit authorization 702 based on the committal key 312 (908). Alternatively or in addition, the cryptologic committal 306 included in the interoperability smart contract 304 may be previously encrypted based on the committal key 312, as discussed in reference to FIGS. 3 and 4. The data furnisher 108 may communicate the encrypted pre-commit authorization 702 to the data receiver 110 (910).

The data furnisher 108 may communicate the token data to the data receiver 110 (912). The data furnisher 108 may receive, from the data receiver 110, or some other participant of the receiver DLT network 204, the pre-commit acknowledgement 310 (914).

The pre-commit acknowledgement 310 may include a verification that the token data was successfully received and/or generated by the data receiver 110. Alternatively or in addition, the pre-commit acknowledgement 310 may indicate that the token data was successfully appended to the receiver blockchain 212. In some examples, the pre-commit acknowledgement 310 may include digital signatures signed by one or more data receivers. For example, the one or more data receiver 110 may be identified in the interoperability smart contract 304. The digital signatures may verify that the data is properly re-generated and/or added to the receiver blockchain 212 in compliance with the receiver DLT and/or the criteria of the interoperability smart contract 304. In some examples, the data furnisher 108 may append the pre-commit acknowledgement to the furnisher blockchain 210 in accordance with the furnisher DLT.

The data furnisher 108 may receive a pre-lock authorization 704 (916). The data furnisher 108 may receive the pre-lock authorization 704 from the data receiver 110. The pre-lock authorization 704 may include an authorization to export token data stored on the furnisher blockchain 210 to the receiver blockchain 212. Alternatively or in addition, the pre-lock authorization 704 may include proofs that various conditions, criteria, and/or rules defined in the interoperability smart contract 304 are satisfied. For example, the pre-commit authorization 702 may include a digital signature of one or more participant of the receiver DLT network 204 that indicate various provisions of the interoperability smart contract 304 are satisfied. In some examples, the data furnisher 108 may append the pre-lock authorization 704 to the furnisher blockchain 210 in accordance with the furnisher DLT.

The data furnisher 108 may communicate a pre-lock acknowledgment 506 (918). The data furnisher 108 may communicate the pre-lock acknowledgement 506 to the data receiver 110, or some furnisher participant. The data furnisher 108 may generate the pre-lock acknowledgement 506 in response to determination that token data has been successfully recreated by the data receiver 110. Alternatively or in addition, the data furnisher 108 may generate the pre-lock acknowledgement 506 based on verification that one or more data receivers agree that the token data was properly recreated within the receiver DLT network 204. In some examples, the interoperability smart contract 304 may identify the one or more data furnishers. The data furnisher 108 may receive and validate the digital signatures generated by the data receivers.

The data furnisher 108 may receive a lock key 508 from the data receiver 110 (920). The data furnisher 108 may unencrypt the pre-commit authorization based on the lock key 508 (922). Based on the lock key 508 and the cryptologic lock instruction 504 of the interoperability smart contract 304, the data furnisher 108 may lock the data on the furnisher blockchain 210 (924). For example, as discussed in reference to FIG. 7, the cryptologic lock instruction 504 may cause the data furnisher 108 to perform the lock in response to receipt of the pre-lock authorization 704. The pre-lock authorization 704 may be encrypted until the data receiver 110 provides the lock key 508. The data furnisher 108 may unencrypt the pre-lock authorization 704 based on the lock key 508.

The data furnisher 108 may send the committal key 312 to the data receiver 110 (926). For example, the data furnisher 108 may determine that various preconditions of the interoperability smart contract 304 are satisfied. The preconditions may include, for example, receipt of the pre-commit acknowledgement 310. In some examples, the data furnisher 108 may verify digital signatures received by the receiver DLT based on public keys of the participants of the receiver DLT available to the data furnisher 108. In response to determination the pre-conditions of the interoperability smart contract 304 are satisfied, the data furnisher 108 may communicate the committal key 312 to the data receiver 110.

Referring to operations 927-946, the data receiver 110 may communicate with the data furnisher 108, or other participants of the furnisher DLT network 202 to generate and/or commit the token data to the receiver blockchain 212.

The data receiver 110 may append interoperability smart contract 304 to the receiver blockchain 212 (927). The data receiver 110 may receive the pre-commit authorization 702 (928). After receiving the authorization, the data receiver 110 may obtain the token data (930).

For example, the data receiver 110 may receive the pre-commit authorization 702 from the data furnisher 108. In response to receipt of the pre-commit authorization 702, the data receiver 110 may receive the token data from the data furnisher 108. Alternatively or in addition, the data receiver 110 may access the transfer logic 308 included in the interoperability smart contract 304. The data receiver 110 may generate and/or recreate the token data based on the transfer logic 308.

The data receiver 110 may transmit the pre-commit acknowledgement 310 to the data furnisher 108 (932). For example, after the token data is received and/or re-generated, the data receiver 110 may generate the pre-commit acknowledgment 310 as proof of creation. Alternatively or in addition, the pre-commit acknowledgement may include the digital signatures of one or more participant of the receiver DLT network 204. The digital signatures may be indicative of consensus that the token data was properly created and/or appended to the blockchain. Alternatively or in addition, the digital signatures may be indicative of consensus that the token data is ready for committal.

The data receiver 110 may generate the pre-lock authorization 704 (934). The data receiver 110 may encrypt the pre-lock authorization 704 (936). The data receiver 110 may communicate the pre-lock authorization 704 to the data furnisher 108 (938). For example, the data receiver 110 may encrypt the pre-lock authorization 704 based on the lock key 508. Since the cryptologic lock instruction may access the pre-lock authorization 704 to lock the token data, the data receiver 110 may control the timing of when the lock occurs.

The data receiver 110 may receive the pre-lock acknowledgement (940). In response to the pre-lock acknowledgement, the data receiver 110 may communicate the lock key 508 to the data furnisher 108 (942).

For example, the pre-lock acknowledgement may an indication that the furnisher DLT network 202 is ready to lock the token data on the blockchain. In some examples, the pre-lock acknowledgement may include digital signatures of one or more participant of the furnisher DLT network 202. In response to verification of the pre-lock acknowledgement, the data receiver may supply the lock key 508 to the data furnisher 108.

The data receiver 110 may receive the committal key 312 from the data furnisher 108 (944). The data receiver 110 may commit the token data to the receiver blockchain 204 (946). For example, the data receiver 110 may access the export cryptologic committal 306 from the interoperability smart contract 304. The cryptologic committal 306 may include committal logic configured to commit the token data to the receiver blockchain 212 in response to the pre-commit authorization 702. The data receiver 110 may decrypt the pre-commit authorization 702 based on the committal key 312 and then perform the committal.

Figure 10:
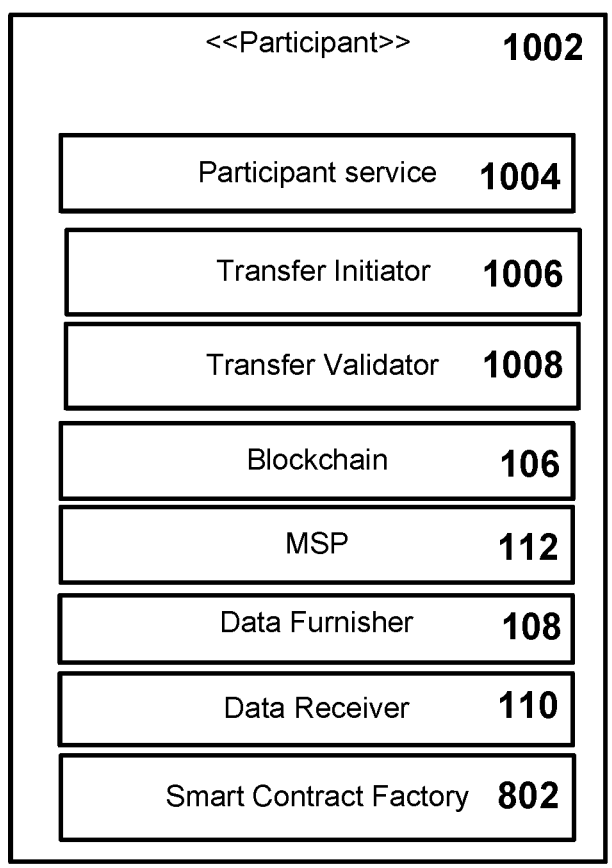
FIG. 10 illustrates an example of an interoperable participant of a distributed ledger technology network.

FIG. 10 illustrates an example of an interoperable participant 1002 of the DLT network 104. The interoperable participant 1002 may include a participation service 1004 that causes the interoperable participant 1002 to be a full or partial node of the DLT network 104. The DLT network 104 may include, for example, the furnisher DLT network 202, the receiver DLT network 204, or some other DLT network. The participant layer may access, modify, append, or otherwise interact with the blockchain and other participants of the DLT network 104 in a manner that is compliant with the protocols of the DLT network 104.

In some examples, the interoperability participant 1002 may include a transfer initiator 1006. The transfer initiator 1006 may coordinate sending and receiving data between blockchains as described herein. For example, the transfer initiator 1006 may include or access the data furnisher 108 and/or the data receiver 110.

In some examples, the interoperability participant 1002 may include a transfer validator 1008. The transfer validator 1008 may validate token data being exchanged between DLT networks. Depending on whether the DLT network 104 is sending or receiving token data, the transfer validator may validate differently. For example, the transfer validator 1008 may authorize and/or validate with other participants of the DLT network 104 to export or share information from the DLT network 104 as described herein. For example, the furnisher 1008 604 may reach consensus with a plurality of other participants of the DLT network 104 that information is authorized to be exported or shared. Alternatively or in addition, the transfer validator 1008 may reach consensus with a plurality of other participants that participants of another blockchain and/or the token data complies with the terms, conditions, criteria, and parameters of the interoperability smart contract 304.

Depending in on the implementation, the interoperable participant 1002 may include some or all of the participant service 1004, the blockchain 106, the MSP 112, the transfer initiator 1006, transfer validator 1008, the data furnisher 108, the data receiver 110 and/or the smart contract factory 802. In examples, where the interoperable participant 1002 includes the MSP 112 and/or the smart contract factory 802, the interoperable participant 1002 may be a node of multiple DLT networks and/or may be accessible to multiple DLT networks.

Figure 11:
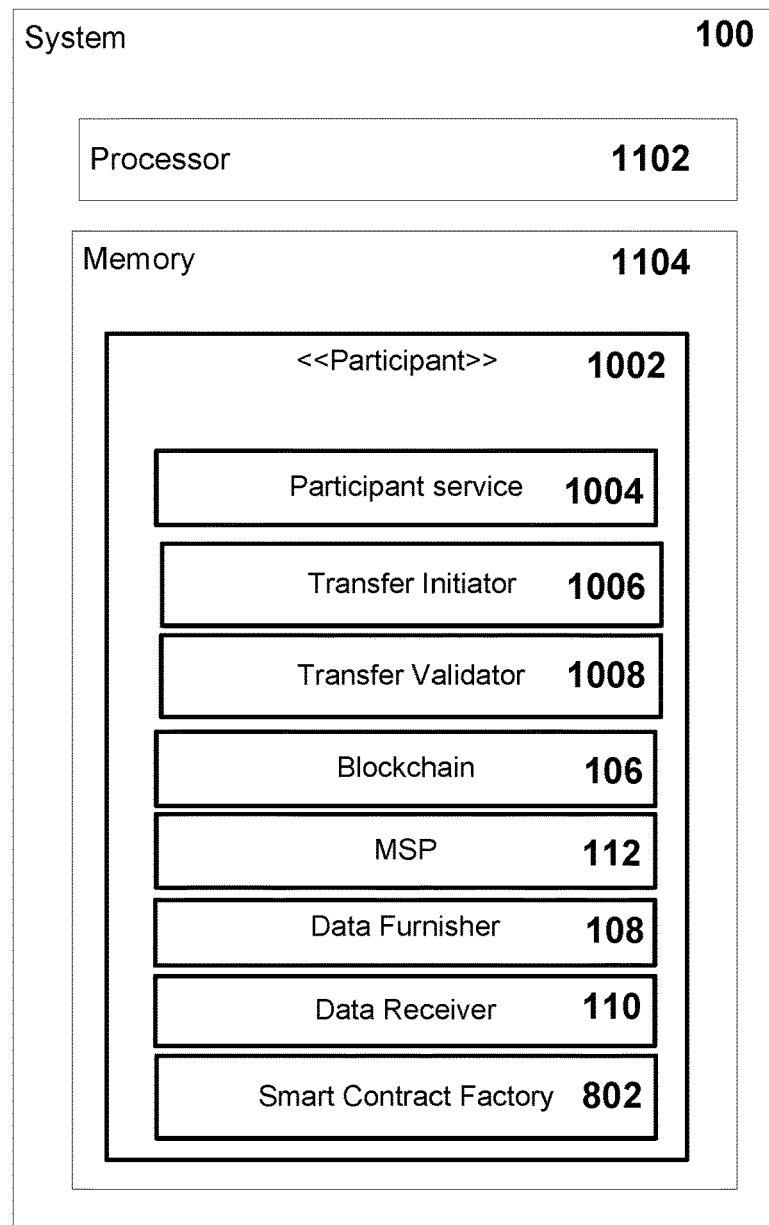
FIG. 11 illustrates an example of a system that includes a processor and a memory.

FIG. 11 illustrates an example of the system 100 that includes a processor 1102 and a memory 1104. The processor 1102 may be in communication with the memory 1104. In one example, the processor 1102 may also be in communication with additional elements, such as a network interface (not shown). Examples of the processor 1102 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1102 may be one or more devices operable to execute logic. The logic may include computer executable instructions or computer code stored in the memory 1104 or in other memory that when executed by the processor 1102, cause the processor 1102 to perform the features implemented by the logic of the interoperable participant 1002, the participant service 1004, the blockchain 106, the MSP 112, the transfer initiator 1006, the data furnisher 108, the data receiver 110, the transfer validator 1008, the smart contract factory 802 and/or the system 100. The computer code may include instructions executable with the processor 1102.

The memory 1104 may be any device for storing and retrieving data or any combination thereof. The memory 1104 may include non-volatile and/or volatile memory, such as a random access memory (RAM), a read-only memory (ROM), an erasable programmable read-only memory (EPROM), or flash memory. Alternatively or in addition, the memory 1104 may include an optical, magnetic (hard-drive) or any other form of data storage device.

The memory 1104 may include at least one the interoperable participant 1002, the participant service 1004, the blockchain 106, the MSP 112, the transfer initiator 1006, the data furnisher 108, the data receiver 110, the transfer validator 1008, the smart contract factory 802 and/or the system 100. In addition, the memory may include any other component, or subcomponent, previously discussed, such as, the interoperability smart contract 304, the FSC 302, the RSC 502, the DLT repository 804, the ESC generator 806, and/or other components of the system 100 described herein.

The system 100 may be implemented in many different ways. For example each component of the system may include a logical component or logical components. Each logical component or logical components may be hardware or a combination of hardware and software. The logical component(s) may include the interoperable participant 1002, the participant service 1004, the blockchain 106, the MSP 112, the transfer initiator 1006, the data furnisher 108, the data receiver 110, the transfer validator 1008, the smart contract factory 802, the system 100 and/or other components and subcomponents of the system 100 described herein. For example, each logical component(s) may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory 1104, for example, that comprises instructions executable with the processor 1102 or other processor to implement one or more of the features of the logical component(s). When any one of the logical components includes the portion of the memory that comprises instructions executable with the processor 1102, the logical component may or may not include the processor 1102. In some examples, each logical component may just be the portion of the memory 1104 or other physical memory that comprises instructions executable with the processor 1102 or other processor to implement the features of the corresponding logical component without the logical component including any other hardware. Because each logical component includes at least some hardware even when the included hardware comprises software, each logical component may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

In some examples, the systems and methods described here may be related to the following aspects:

1. A method comprising:
  appending, to a furnisher blockchain, an interoperability smart contract comprising a cryptologic committal, the cryptologic committal comprising commit logic configured to cause a data receiver to commit token data to a receiver blockchain based on a pre-commit authorization;
  encrypting, based on a predetermined committal key, the pre-commit authorization to transfer token data stored on the furnisher blockchain to the receiver blockchain;
  sending the pre-commit authorization to the data receiver;
  after sending the pre-commit authorization, receiving a pre-commit acknowledgement of the pre-commit authorization; and
  responsive to the pre-commit acknowledgement:
    locking the token data on the furnisher blockchain in response to verification that the token data is appended to the receiver blockchain, and
    sending the predetermined committal key to the data receiver, the data receiver configured to execute the commit logic based on the pre-commit authorization unencrypted by the predetermined committal key and commit the token data to the receiver blockchain based on the commit logic.

2. The method of aspect 1, wherein the interoperability smart contract further comprises a cryptologic lock instruction configured to cause to the data receiver to lock to the token data on the furnisher blockchain based on a pre-lock authorization, wherein locking the token data on the furnisher blockchain further comprises:
  receiving the pre-lock authorization from the data receiver; and
  locking the token data based on the cryptologic lock instruction and the pre-lock authorization.

3. The method of any of aspects 1-2, wherein the pre-lock authorization is encrypted based on a predetermined lock key for the data receiver, the method further comprising:
  receiving the predetermined lock key from the data receiver; and
  unencrypting the pre-lock authorization based on the received the predetermined lock key.

4. The method of any of aspects 1-3, wherein the furnisher blockchain is compliant with a first distributed ledger technology and the receiver blockchain is compliant with a second distributed ledger technology, the method further comprising:
  accessing a smart-contract factory comprising DLT logic associated with a respective distributed ledger technology;
  selecting, from the DLT logic, the cryptologic committal; and
  generating the interoperability smart contract, wherein the interoperability smart contract includes the cryptologic committal.

5. The method of any of aspects 1-4, wherein locking the token data on the furnisher blockchain in response to verification that the token data is appended to the receiver blockchain further comprises:
  appending, to the furnisher blockchain, a second datablock comprising identifier of token data stored on the furnisher blockchain and a hash of a separate datablock stored in the furnisher blockchain.

6. The method of any of aspects 1-5, wherein the interoperability smart contract further comprises transfer logic that defines a data structure for the token data for the receiver blockchain, the method further comprising:
  receiving a request for the token data from the data receiver; and
  recreating the token data based on the data structure; and
  communicating the recreated token data to the data receiver in response to receipt of the request.

7. The method of any of aspects 1-6, wherein the furnisher blockchain is compliant with a first distributed ledger technology and the receiver blockchain is compliant with a second distributed ledger technology, the method further comprising:

receiving digital signatures of one or more participants of the second distributed ledger technology, the digital signatures indicative of the token data being appended to the receiver blockchain; and verifying the digital signatures based on respective public keys the one or more participants.

8. A system comprising:

a processor, the processor configured to:

append, to a furnisher blockchain, an interoperability smart contract comprising a cryptologic committal, the cryptologic committal comprising commit logic configured to cause a data receiver to commit token data to a receiver blockchain based on a pre-commit authorization;

encrypt, based on a predetermined committal key, the pre-commit authorization to transfer token data stored on the furnisher blockchain to the receiver blockchain;

transmit the pre-commit authorization to the data receiver;

after transmission of the pre-commit authorization, receive a pre-commit acknowledgement of the pre-commit authorization; and responsive to the pre-commit acknowledgement:

lock the token data on the furnisher blockchain in response to verification that the token data is appended to the receiver blockchain, and send the predetermined committal key to the data receiver, the data receiver configured to execute the commit logic based on the pre-commit authorization unencrypted by the predetermined committal key and commit the token data to the receiver blockchain based on the commit logic.

9. The system of aspect 8, wherein the interoperability smart contract further comprises a cryptologic lock instruction configured to cause to the data receiver to lock to the token data on the furnisher blockchain based on a pre-lock authorization, wherein to lock the token data on the furnisher blockchain, the processor is further configured to:

receive the pre-lock authorization from the data receiver; and lock the token data based on the cryptologic lock instruction and the pre-lock authorization.

10. The system of any of aspects 8-9, wherein the pre-lock authorization is encrypted based on a predetermined lock key for the data receiver, wherein the processor is further configured to:

receive the predetermined lock key from the data receiver; and unencrypt the pre-lock authorization based on the received the predetermined lock key.

11. The system of any of aspects 8-10, wherein the furnisher blockchain is compliant with a first distributed ledger technology and the receiver blockchain is compliant with a second distributed ledger technology, wherein the processor is further configured to:

access a smart-contract factory comprising DLT logic associated with a respective distributed ledger technology;

select, from the DLT logic, the cryptologic committal; and generate the interoperability smart contract, wherein the interoperability smart contract includes the cryptologic committal.

12. The system of any of aspects 8-11, wherein to lock the token data on the furnisher blockchain in response to verification that the token data is appended to the receiver blockchain, the processor is further configured to:

append, to the furnisher blockchain, a second datablock comprising identifier of token data stored on the furnisher blockchain and a hash of a separate datablock stored in the furnisher blockchain.

13. The system of any of aspects 8-12, wherein the interoperability smart contract further comprises transfer logic that defines a data structure for the token data for the receiver blockchain, wherein the processor is further configured to:

receive a request for the token data from the data receiver; and recreate the token data based on the data structure; and communicate the recreated token data to the data receiver in response to receipt of the request.

14. The system of any of aspects 8-13, wherein the furnisher blockchain is compliant with a first distributed ledger technology and the receiver blockchain is compliant with a second distributed ledger technology, wherein the processor is further configured to:

receive digital signatures of one or more participants of the second distributed ledger technology, the digital signatures indicative of the token data being appended to the receiver blockchain; and verify the digital signatures based on respective public keys the one or more participants.

15. A non-transitory computer readable storage medium comprising:

a plurality of instructions executable by a processor, the instructions comprising instructions that cause the processor to:

receive an encrypted pre-commit authorization to transfer token data stored on a furnisher blockchain to a receiver blockchain;

access, from the receiver blockchain, an interoperability smart contract comprising a cryptologic committal, the cryptologic committal comprising commit logic configured to cause committal of the token data to the receiver blockchain based on the pre-commit authorization;

generate the token data;

transmit a pre-commit acknowledgement to a data furnisher in response to generation of the token data; and after transmission of the pre-commit authorization:

receive a committal key from the data furnisher, unencrypt the pre-commit authorization, and commit the token data to the receiver blockchain based on the unencrypted pre-commit authorization and the cryptologic committal.

16. The non-transitory computer readable storage medium of aspect 15, wherein the instruction executable by the processor to commit the token data to the receiver blockchain further cause the processor to:

append a datablock to the receiver blockchain indicative of the committal of the token data to the receiver blockchain, the datablock further comprising a hash to a previous datablock on the receiver blockchain.

17. The non-transitory computer readable storage medium of any of aspects 15-16, wherein the instructions executable by the processor further cause the processor to:

access a smart-contract factory comprising DLT logic associated with a respective distributed ledger technologies;

select, from the DLT logic, the cryptologic committal; and generate the interoperability smart contract, wherein the interoperability smart contract includes the cryptologic committal.

18. The non-transitory computer readable storage medium of any of aspects 15-17, wherein the instructions executable by the processor further cause the processor to:

generate, to the data furnisher, a pre-lock authorization comprising an authorization to lock to the token data on the furnisher blockchain;
encrypt the pre-lock authorization based on a lock key;
communicate the pre-lock authorization to the data furnisher;
receive a pre-lock acknowledgement from the data furnisher; and
communicate the lock key to the data furnisher to unencrypt the pre-lock authorization.

19. The non-transitory computer readable storage medium of of any of aspects 15-18, wherein the instructions executable by the processor further cause the processor to:
receive the interoperability smart contract; and
append a datablock to the receiver blockchain comprising the interoperability smart contract and a hash of a separate datablock on the receiver blockchain.

20. The non-transitory computer readable storage medium of any of aspects 15-19, wherein the interoperability smart contract comprises transfer logic that defines a data structure for the receiver blockchain; wherein the instructions executable by the processor to generate the token data further cause the processor to:
communicate a request to the data furnisher for the token data;
receive, from the data furnisher, the token data;
recreate the token data based on the data structure defined in the transfer logic; and
append a datablock to the receiver blockchain, the datablock comprising at least a portion of the recreated token data and a hash to at least one portion of a previous datablock on the receiver blockchain.

What is claimed is:

1. A method comprising:
appending, to a furnisher blockchain, an interoperability smart contract comprising a cryptologic committal, the cryptologic committal comprising commit logic configured to cause a data receiver to commit token data to a receiver blockchain based on a pre-commit authorization;
encrypting, based on a predetermined committal key, the pre-commit authorization to transfer token data stored on the furnisher blockchain to the receiver blockchain;
sending the pre-commit authorization to the data receiver;
after sending the pre-commit authorization, receiving a pre-commit acknowledgement of the pre-commit authorization; and
responsive to the pre-commit acknowledgement:
locking the token data on the furnisher blockchain in response to verification that the token data is appended to the receiver blockchain, and
sending the predetermined committal key to the data receiver, the data receiver configured to execute the commit logic based on the pre-commit authorization unencrypted by the predetermined committal key and commit the token data to the receiver blockchain based on the commit logic.

2. The method of claim 1, wherein the interoperability smart contract further comprises a cryptologic lock instruction configured to cause to the data receiver to lock to the token data on the furnisher blockchain based on a pre-lock authorization, wherein locking the token data on the furnisher blockchain further comprises:
receiving the pre-lock authorization from the data receiver; and
locking the token data based on the cryptologic lock instruction and the pre-lock authorization.

3. The method of claim 2, wherein the pre-lock authorization is encrypted based on a predetermined lock key for the data receiver, the method further comprising:
receiving the predetermined lock key from the data receiver; and
unencrypting the pre-lock authorization based on the received the predetermined lock key.

4. The method of claim 1 wherein the furnisher blockchain is compliant with a first distributed ledger technology and the receiver blockchain is compliant with a second distributed ledger technology, the method further comprising:
accessing a smart-contract factory comprising DLT logic associated with a respective distributed ledger technology;
selecting, from the DLT logic, the cryptologic committal; and
generating the interoperability smart contract, wherein the interoperability smart contract includes the cryptologic committal.

5. The method of claim 1, wherein locking the token data on the furnisher blockchain in response to verification that the token data is appended to the receiver blockchain further comprises:
appending, to the furnisher blockchain, a second datablock comprising identifier of token data stored on the furnisher blockchain and a hash of a separate datablock stored in the furnisher blockchain.

6. The method of claim 1, wherein the interoperability smart contract further comprises transfer logic that defines a data structure for the token data for the receiver blockchain, the method further comprising:
receiving a request for the token data from the data receiver; and
recreating the token data based on the data structure; and
communicating the recreated token data to the data receiver in response to receipt of the request.

7. The method of claim 1, wherein the furnisher blockchain is compliant with a first distributed ledger technology and the receiver blockchain is compliant with a second distributed ledger technology, the method further comprising:
receiving digital signatures of one or more participants of the second distributed ledger technology, the digital signatures indicative of the token data being appended to the receiver blockchain; and
verifying the digital signatures based on respective public keys the one or more participants.

8. A system comprising:
a processor and a memory, the processor configured to:
append, to a furnisher blockchain, an interoperability smart contract comprising a cryptologic committal, the cryptologic committal comprising commit logic configured to cause a data receiver to commit token data to a receiver blockchain based on a pre-commit authorization;
encrypt, based on a predetermined committal key, the pre-commit authorization to transfer token data stored on the furnisher blockchain to the receiver blockchain;
transmit the pre-commit authorization to the data receiver;
after transmission of the pre-commit authorization, receive a pre-commit acknowledgement of the pre-commit authorization; and
responsive to the pre-commit acknowledgement:
lock the token data on the furnisher blockchain in response to verification that the token data is appended to the receiver blockchain, and send the predetermined committal key to the data receiver, the data receiver configured to execute the commit logic based on the pre-commit authorization unencrypted by the predetermined committal key and commit the token data to the receiver blockchain based on the commit logic.

9. The system of claim 8, wherein the interoperability smart contract further comprises a cryptologic lock instruction configured to cause to the data receiver to lock to the token data on the furnisher blockchain based on a pre-lock authorization, wherein to lock the token data on the furnisher blockchain, the processor is further configured to:
receive the pre-lock authorization from the data receiver; and
lock the token data based on the cryptologic lock instruction and the pre-lock authorization.

10. The system of claim 9, wherein the pre-lock authorization is encrypted based on a predetermined lock key for the data receiver, wherein the processor is further configured to:
receive the predetermined lock key from the data receiver; and
unencrypt the pre-lock authorization based on the received the predetermined lock key.

11. The system of claim 8 wherein the furnisher blockchain is compliant with a first distributed ledger technology and the receiver blockchain is compliant with a second distributed ledger technology, wherein the processor is further configured to:
access a smart-contract factory comprising DLT logic associated with a respective distributed ledger technology;
select, from the DLT logic, the cryptologic committal; and
generate the interoperability smart contract, wherein the interoperability smart contract includes the cryptologic committal.

12. The system of claim 8, wherein to lock the token data on the furnisher blockchain in response to verification that the token data is appended to the receiver blockchain, the processor is further configured to:
append, to the furnisher blockchain, a second datablock comprising identifier of token data stored on the furnisher blockchain and a hash of a separate datablock stored in the furnisher blockchain.

13. The system of claim 8, wherein the interoperability smart contract further comprises transfer logic that defines a data structure for the token data for the receiver blockchain, wherein the processor is further configured to:
receive a request for the token data from the data receiver; and
recreate the token data based on the data structure; and
communicate the recreated token data to the data receiver in response to receipt of the request.

14. The system of claim 8, wherein the furnisher blockchain is compliant with a first distributed ledger technology and the receiver blockchain is compliant with a second distributed ledger technology, wherein the processor is further configured to:
receive digital signatures of one or more participants of the second distributed ledger technology, the digital signatures indicative of the token data being appended to the receiver blockchain; and
verify the digital signatures based on respective public keys the one or more participants.

15. A non-transitory computer readable storage medium comprising:
a plurality of instructions executable by a processor, the instructions comprising instructions that cause the processor to:
receive an encrypted pre-commit authorization to transfer token data stored on a furnisher blockchain to a receiver blockchain;
access, from the receiver blockchain, an interoperability smart contract comprising a cryptologic committal, the cryptologic committal comprising commit logic configured to cause committal of the token data to the receiver blockchain based on the pre-commit authorization;
generate the token data;
transmit a pre-commit acknowledgement to a data furnisher in response to generation of the token data; and
after transmission of the pre-commit authorization:
receive a committal key from the data furnisher,
unencrypt the pre-commit authorization based on the committal key, and
commit the token data to the receiver blockchain based on the unencrypted pre-commit authorization and the cryptologic committal.

16. The non-transitory computer readable storage medium of claim 15, wherein the instruction executable by the processor to commit the token data to the receiver blockchain further cause the processor to:
append a datablock to the receiver blockchain indicative of the committal of the token data to the receiver blockchain, the datablock further comprising a hash to a previous datablock on the receiver blockchain.

17. The non-transitory computer readable storage medium of claim 15, wherein the instructions executable by the processor further cause the processor to:
access a smart-contract factory comprising DLT logic associated with a respective distributed ledger technologies;
select, from the DLT logic, the cryptologic committal; and
generate the interoperability smart contract, wherein the interoperability smart contract includes the cryptologic committal.

18. The non-transitory computer readable storage medium of claim 15, wherein the instructions executable by the processor further cause the processor to:
generate, to the data furnisher, a pre-lock authorization comprising an authorization to lock to the token data on the furnisher blockchain;
encrypt the pre-lock authorization based on a lock key;
communicate the pre-lock authorization to the data furnisher;
receive a pre-lock acknowledgement from the data furnisher; and
communicate the lock key to the data furnisher to unencrypt the pre-lock authorization.

19. The non-transitory computer readable storage medium of claim 15, wherein the instructions executable by the processor further cause the processor to:
receive the interoperability smart contract; and
append a datablock to the receiver blockchain comprising the interoperability smart contract and a hash of a separate datablock on the receiver blockchain.

20. The non-transitory computer readable storage medium of claim 15, wherein the interoperability smart contract comprises transfer logic that defines a data structure for the receiver blockchain; wherein the instructions executable by the processor to generate the token data further cause the processor to:

communicate a request to the data furnisher for the token data;
receive, from the data furnisher, the token data;
recreate the token data based on the data structure defined in the transfer logic; and
append a datablock to the receiver blockchain, the datablock comprising at least a portion of the recreated token data and a hash to at least one portion of a previous datablock on the receiver blockchain.

* * * * *